(12) United States Patent
Abiko et al.

(10) Patent No.: US 7,809,168 B2
(45) Date of Patent: Oct. 5, 2010

(54) BIOMETRIC INFORMATION INPUT DEVICE, BIOMETRIC AUTHENTICATION DEVICE, BIOMETRIC INFORMATION PROCESSING METHOD, AND COMPUTER-READABLE RECORDING MEDIUM RECORDING BIOMETRIC INFORMATION PROCESSING PROGRAM

(75) Inventors: Yukihiro Abiko, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 871 days.

(21) Appl. No.: 11/082,137

(22) Filed: Mar. 17, 2005

(65) Prior Publication Data

US 2006/0078176 A1 Apr. 13, 2006

(30) Foreign Application Priority Data

Oct. 8, 2004 (JP) .............................. 2004-296645

(51) Int. Cl.
*G06K 9/00* (2006.01)
(52) U.S. Cl. ...................... 382/115; 382/124
(58) Field of Classification Search ......... 382/124–127, 382/119, 115
See application file for complete search history.

(56) References Cited

U.S. PATENT DOCUMENTS

| 6,289,114 | B1 | 9/2001 | Mainguet | 382/124 |
|---|---|---|---|---|
| 6,317,508 | B1 | 11/2001 | Kramer et al. | 382/124 |
| 6,357,663 | B1 | 3/2002 | Takahashi et al. | |
| 6,594,403 | B1 | 7/2003 | Bozdagi et al. | |
| 6,643,389 | B1 | 11/2003 | Raynal et al. | 382/124 |
| 7,054,470 | B2 * | 5/2006 | Bolle et al. | 382/124 |
| 7,321,671 | B2 * | 1/2008 | McClurg et al. | 382/124 |
| 7,587,072 | B2 * | 9/2009 | Russo et al. | 382/124 |
| 2001/0017934 | A1 * | 8/2001 | Paloniemi et al. | 382/107 |
| 2001/0043728 | A1 | 11/2001 | Kramer et al. | 382/124 |
| 2002/0061125 | A1 | 5/2002 | Fujii | 382/125 |

(Continued)

FOREIGN PATENT DOCUMENTS

EP 1 179 801 A2 2/2002

(Continued)

OTHER PUBLICATIONS

Chinese Patent Office Action, mailed Jun. 8, 2007 and issued in corresponding Chinese Patent Application No. 200510067005.7.

(Continued)

*Primary Examiner*—Matthew C Bella
*Assistant Examiner*—Dennis Rosario
(74) *Attorney, Agent, or Firm*—Staas & Halsey LLP

(57) ABSTRACT

The invention is a biometric information input device including biometric information collection means for reading a relatively-moving living body site and successively collecting a plurality of partial images of the living body site as biometric information, movement direction detection means for detecting a movement direction of the living body site with respect to the biometric information collection means based on the biometric information collected by the biometric information collection means, and coordinate conversion means for performing a coordinate conversion on the biometric information collected by the biometric information collection means using the movement direction detected by the movement direction detection means, thereby allowing the device to be used irrespective of a direction in which a living body is swept when biometric information is entered.

9 Claims, 27 Drawing Sheets

U.S. PATENT DOCUMENTS

| | | | |
|---|---|---|---|
| 2003/0021284 A1* | 1/2003 | Iwasaki et al. | 370/411 |
| 2003/0021451 A1 | 1/2003 | Lee | |
| 2003/0161502 A1 | 8/2003 | Morihara et al. | 382/115 |
| 2004/0052407 A1 | 3/2004 | Kawabe | 382/124 |
| 2005/0025244 A1* | 2/2005 | Lee et al. | 375/240.16 |
| 2005/0100200 A1 | 5/2005 | Abiko et al. | |
| 2006/0061599 A1* | 3/2006 | Yu et al. | 345/649 |

FOREIGN PATENT DOCUMENTS

| | | |
|---|---|---|
| EP | 1 179 801 A3 | 9/2003 |
| EP | 1 437 677 A1 | 7/2004 |
| JP | 10-91769 | 4/1998 |
| JP | 11-253428 | 9/1999 |
| JP | 2000-148963 | 5/2000 |
| JP | 2000-295463 | 10/2000 |
| JP | 2002-109543 | 4/2002 |
| JP | 2002-366950 | 12/2002 |
| JP | 2003-248828 | 9/2003 |
| JP | 2004-110438 | 4/2004 |
| WO | WO 2004/026139 | 4/2004 |

OTHER PUBLICATIONS

Korean Patent Office Action, mailed Jul. 25, 2007 and issued in corresponding Korean Patent Application No. 10-2005-0031946.
Korean Patent Office Action issued Aug. 24, 2006 for corresponding Korean Patent Application No. 10-2005-0031946.
Japanese Patent Office Notice of Rejection mailed Jun. 23, 2009 for corresponding Japanese Patent Application No. 2004-296645.
"2.5 Touch versus Sweep", In: D. Maltoni, et al., "Handbook of Fingerprint Recognition", XP-002567649, pp. 65-69, Oct. 7, 2003.
European Patent Office Search Report mailed Feb. 19, 2010 for corresponding European Patent Application No. 05251764.6.

* cited by examiner

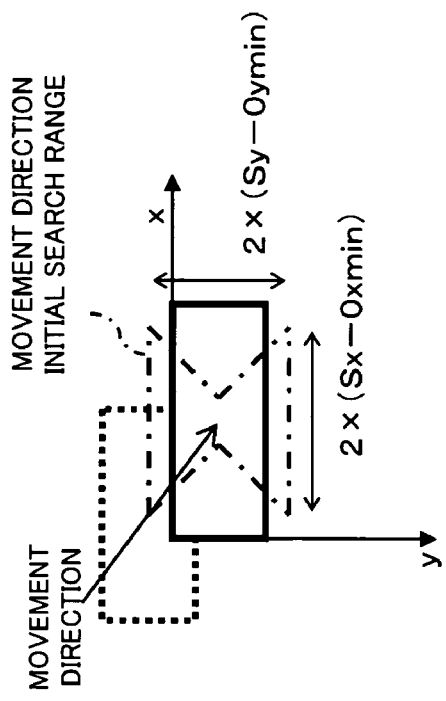
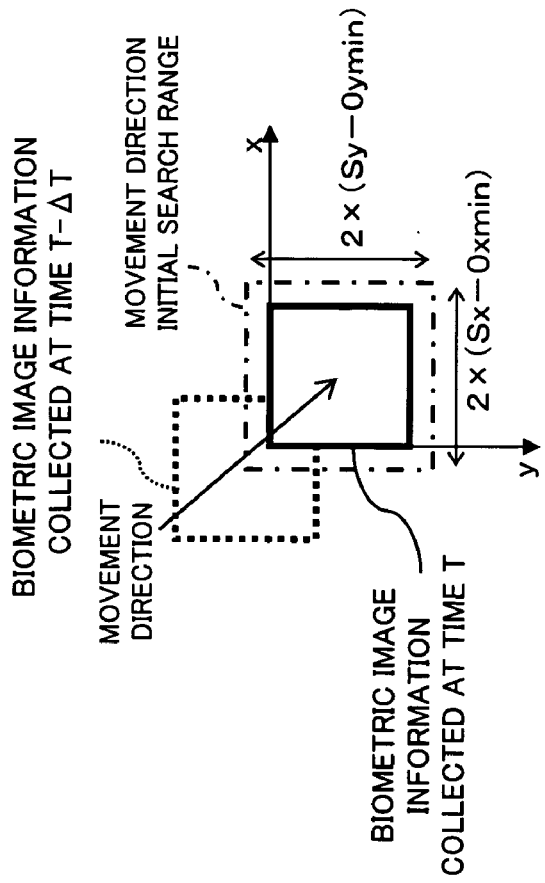

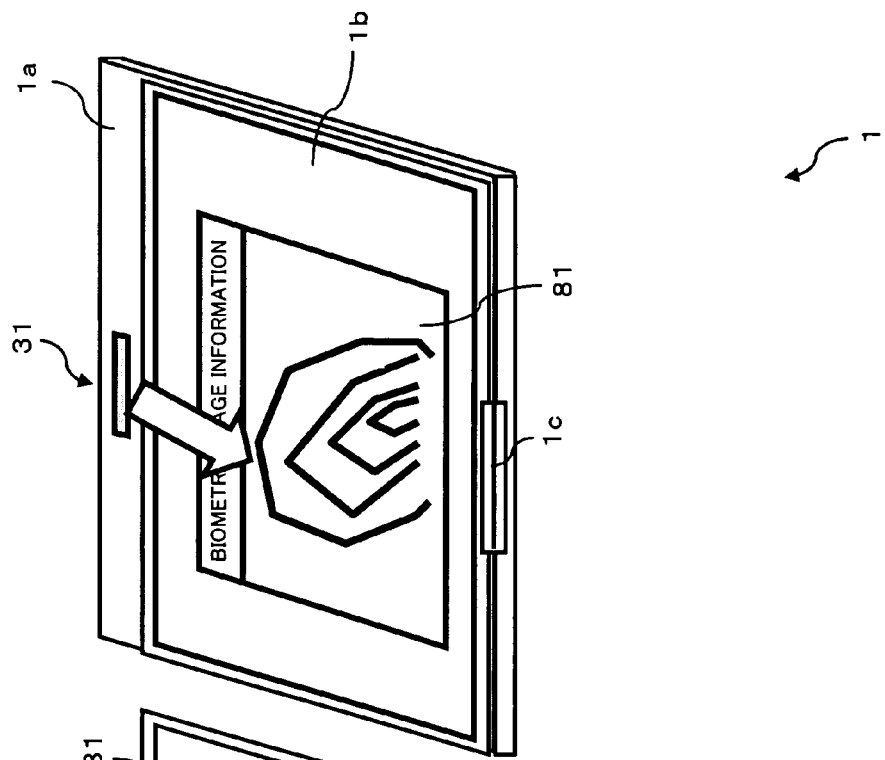
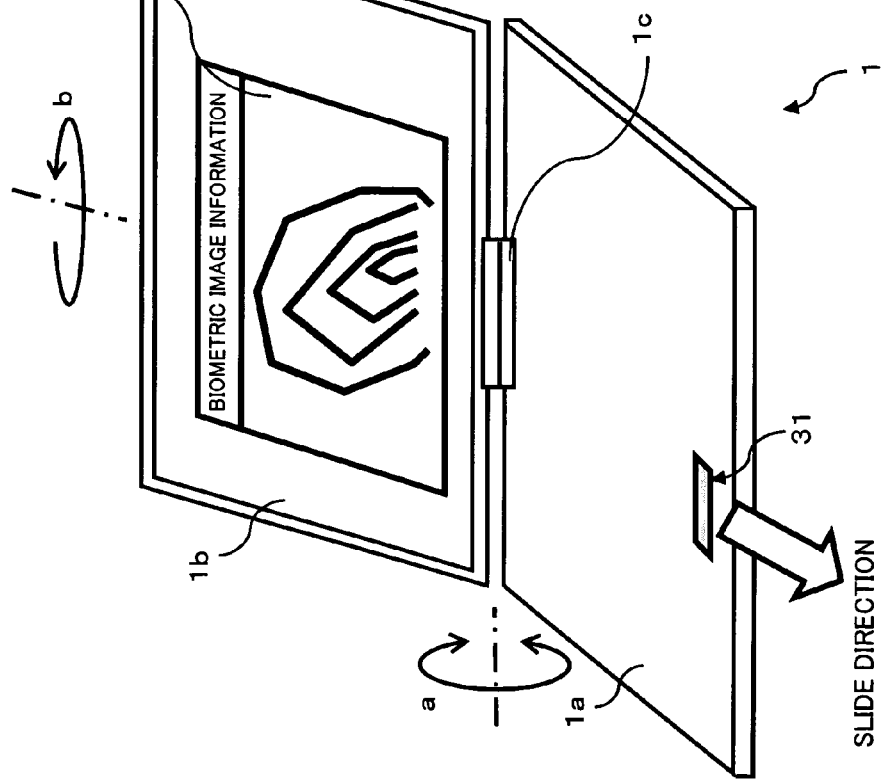

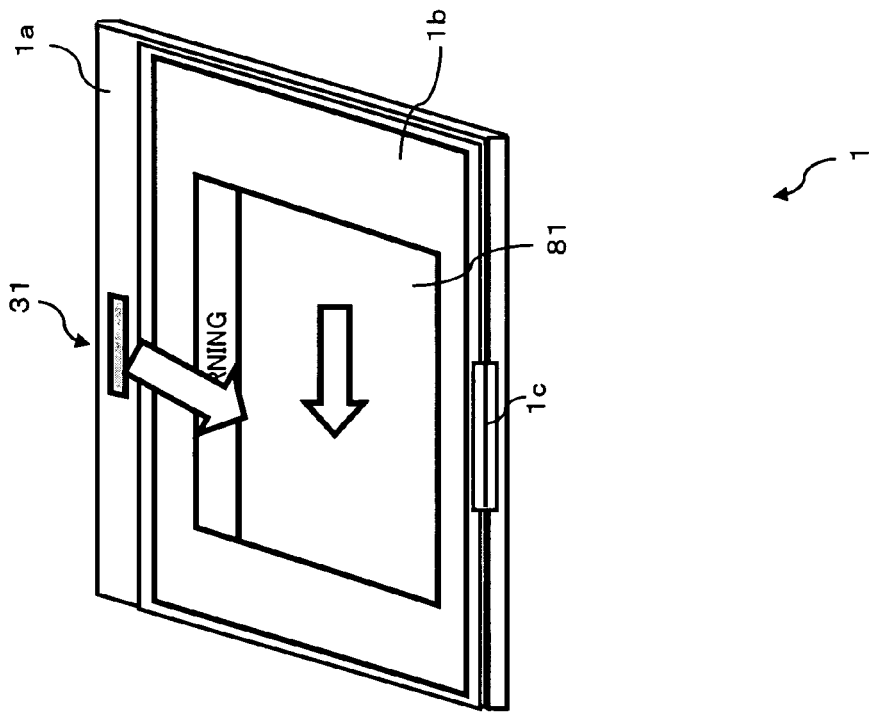
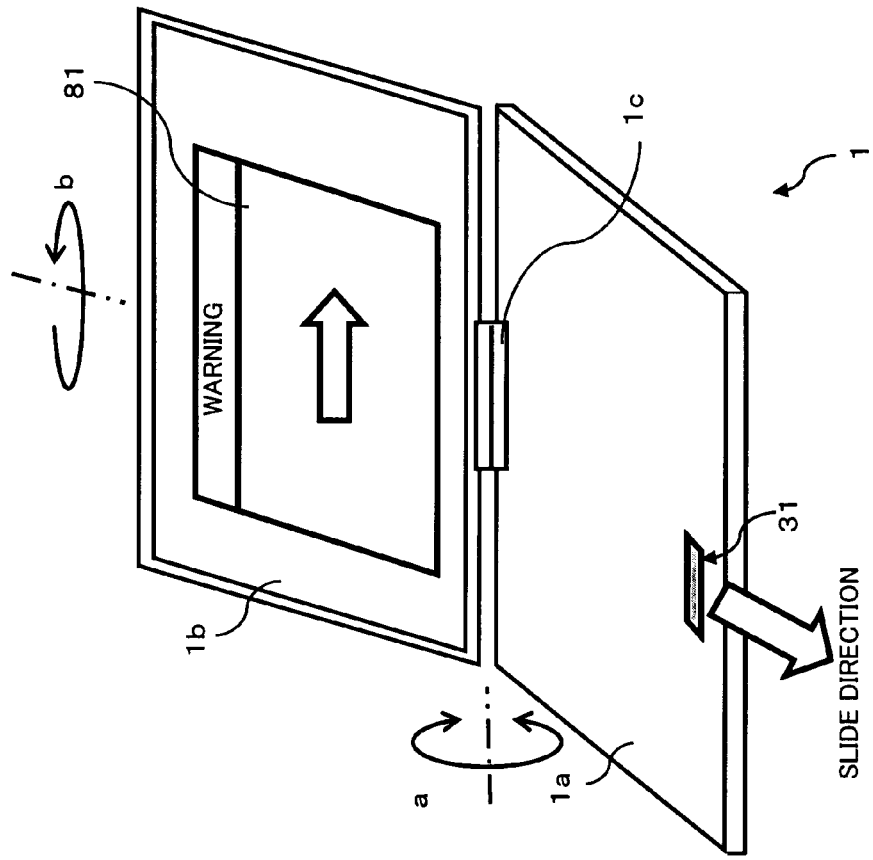

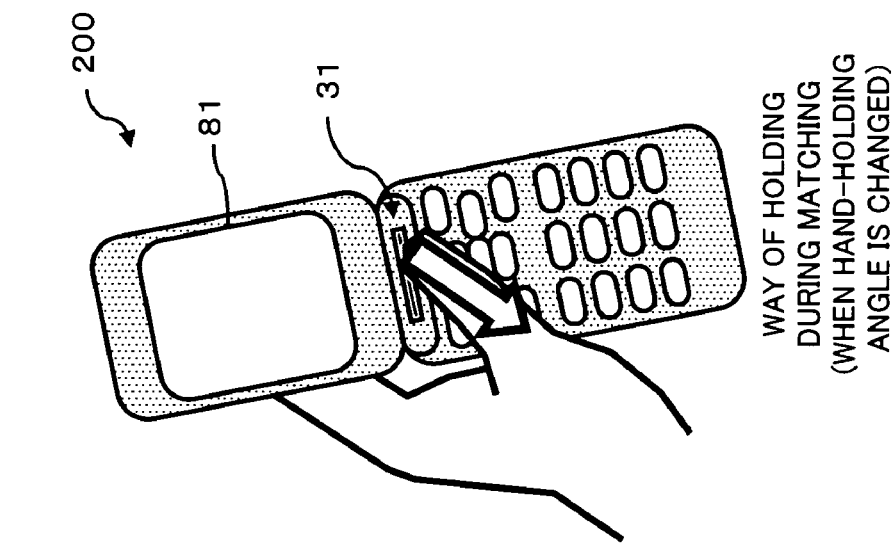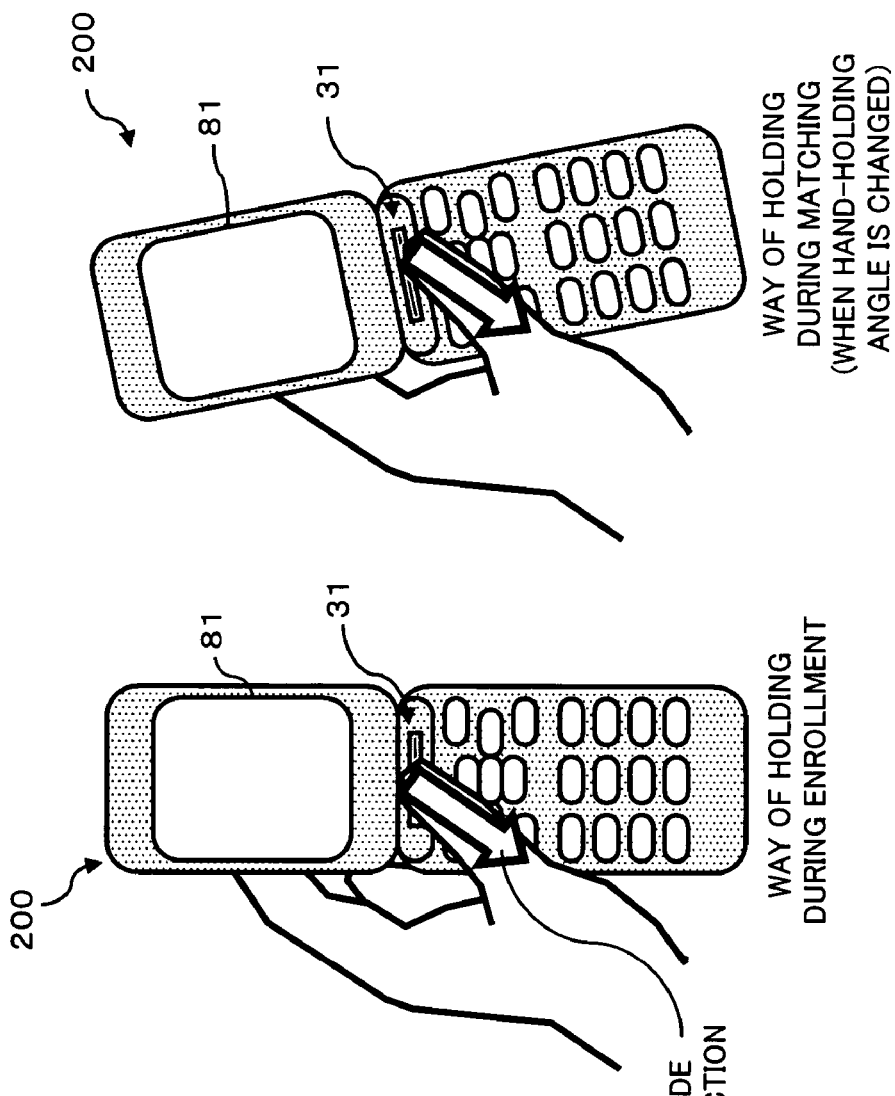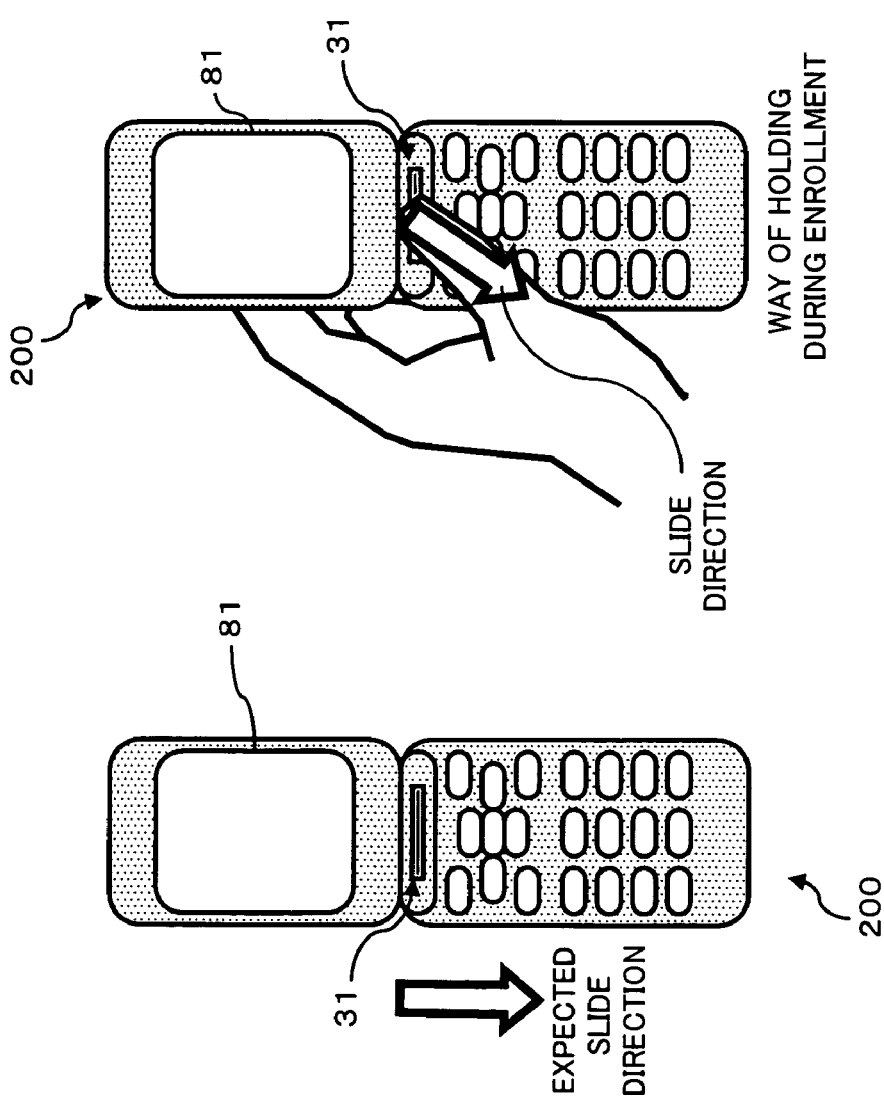

FREE FROM INFLUENCE OF DISPLACEMENT
OF ROTATION DIRECTION DUE
TO WAY OF HAND-HOLDING

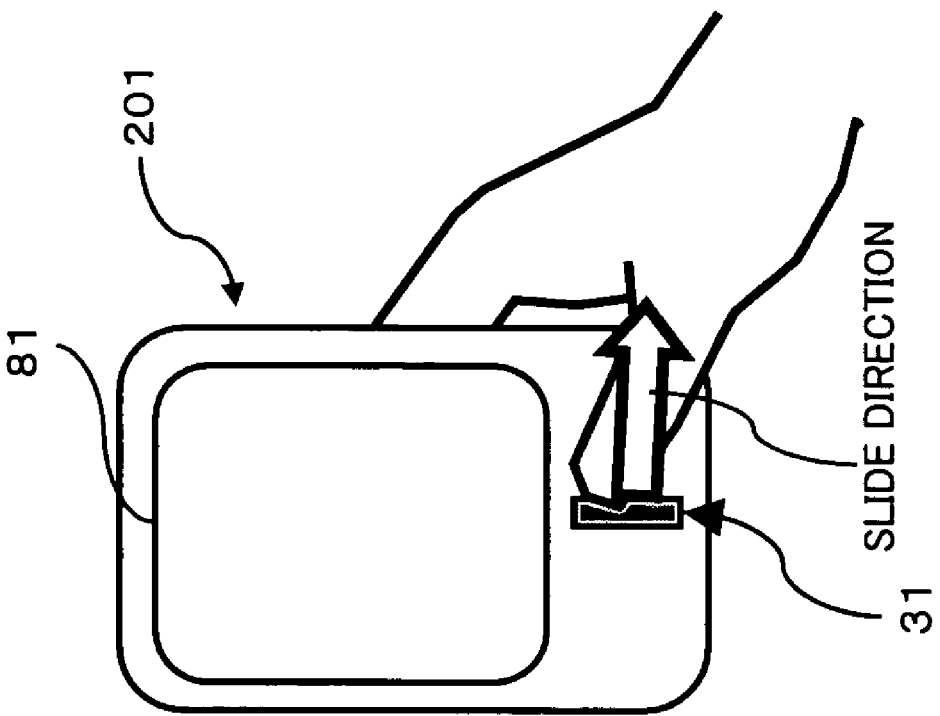
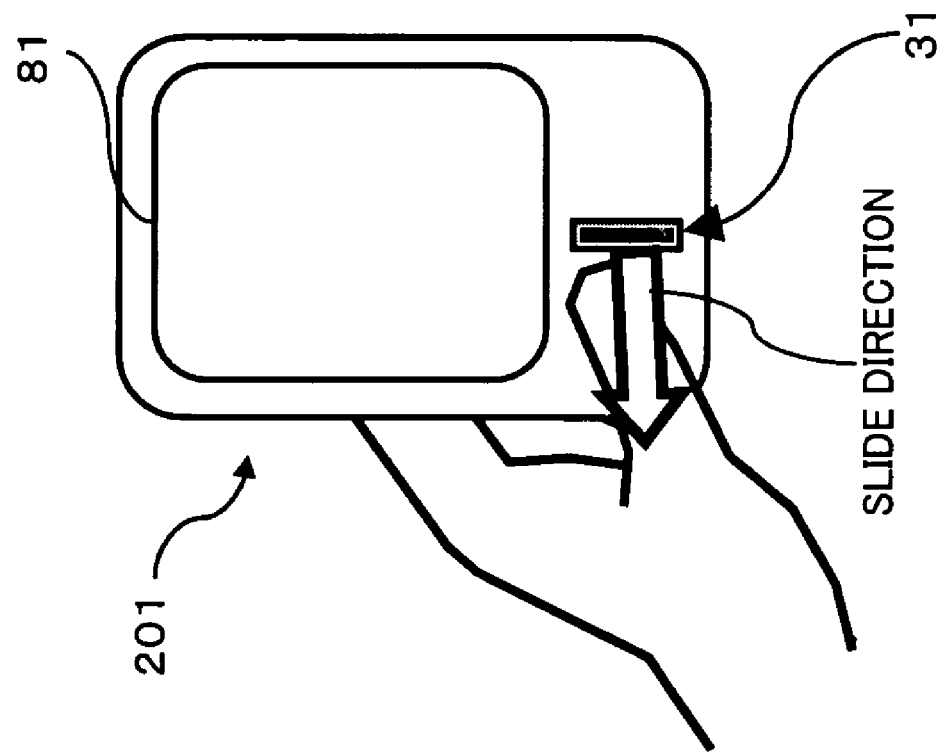

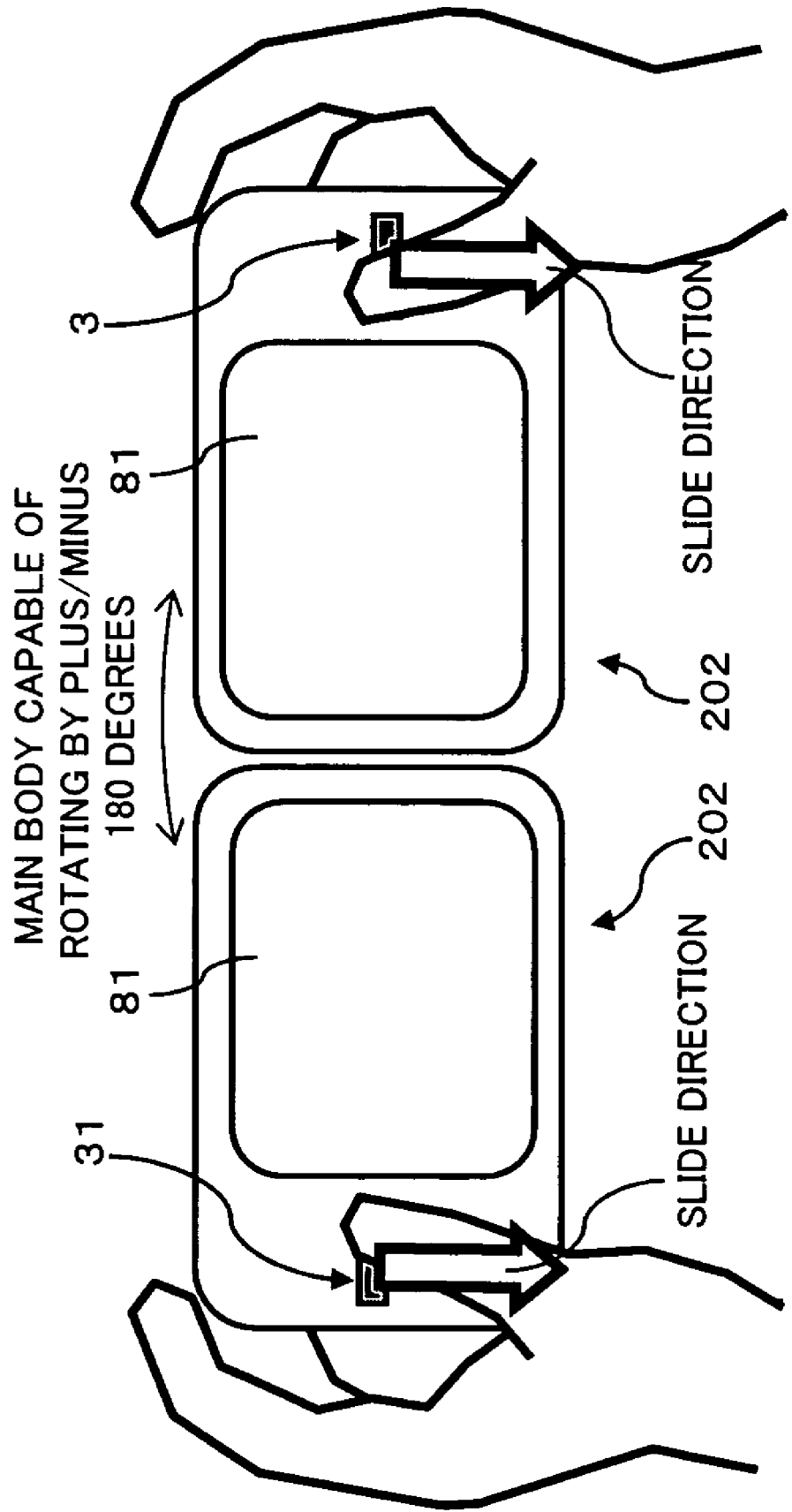

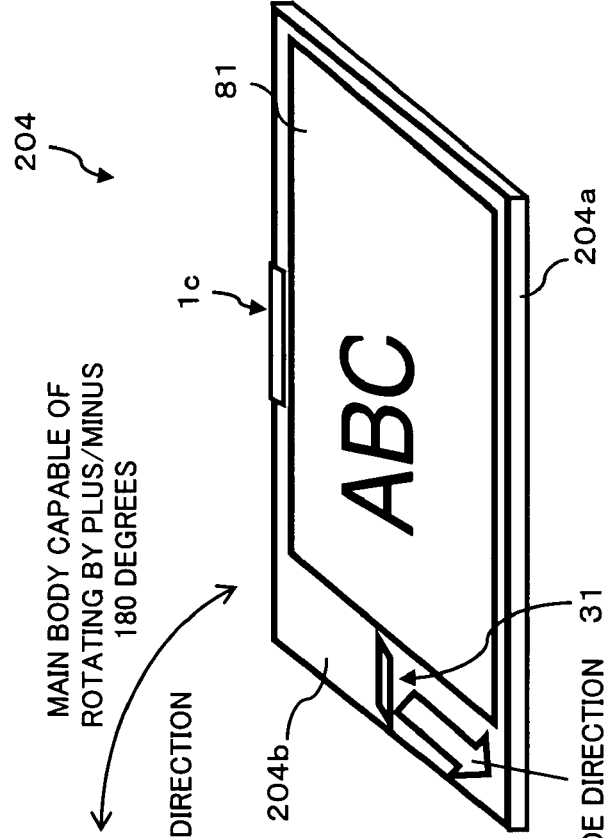
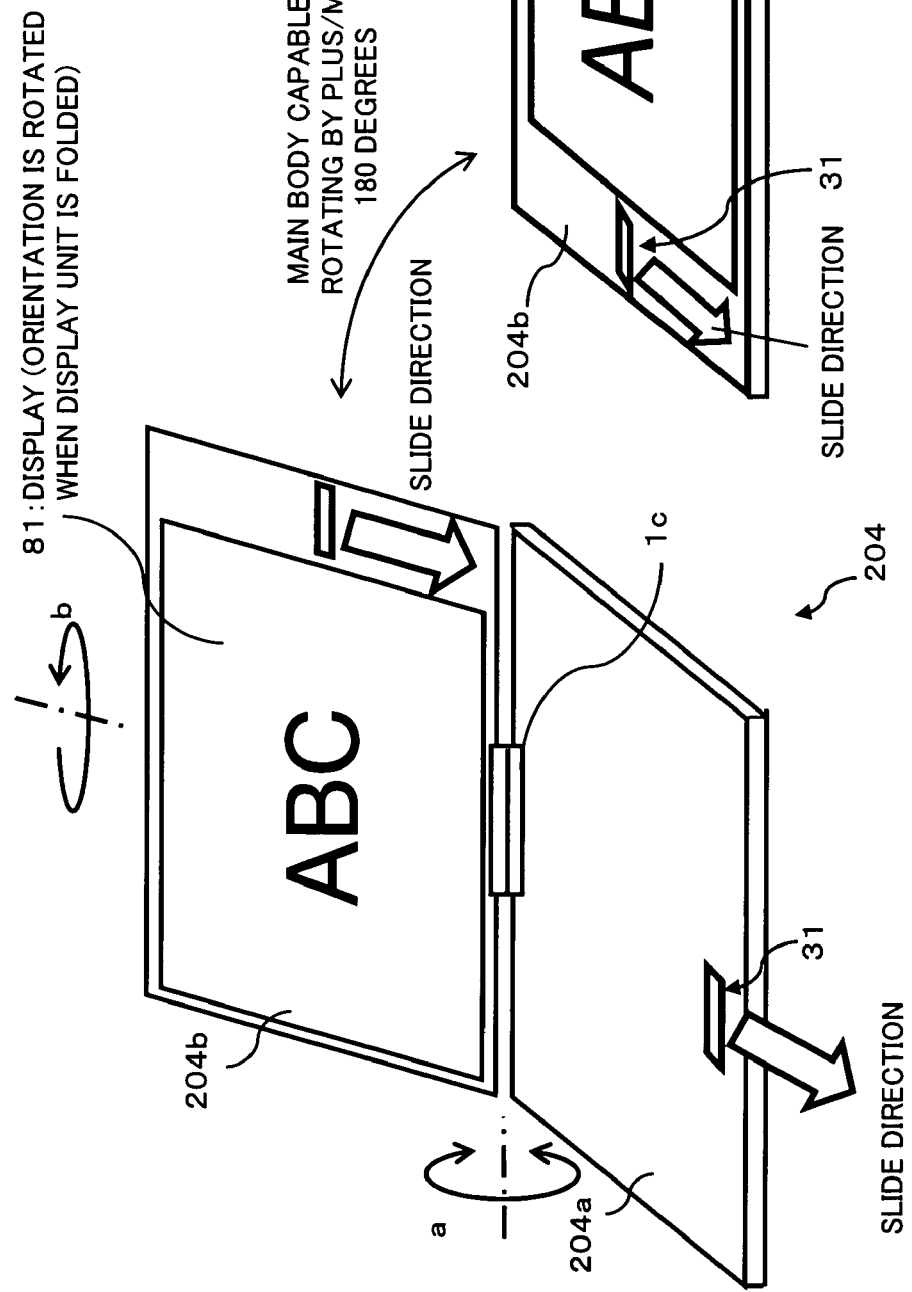

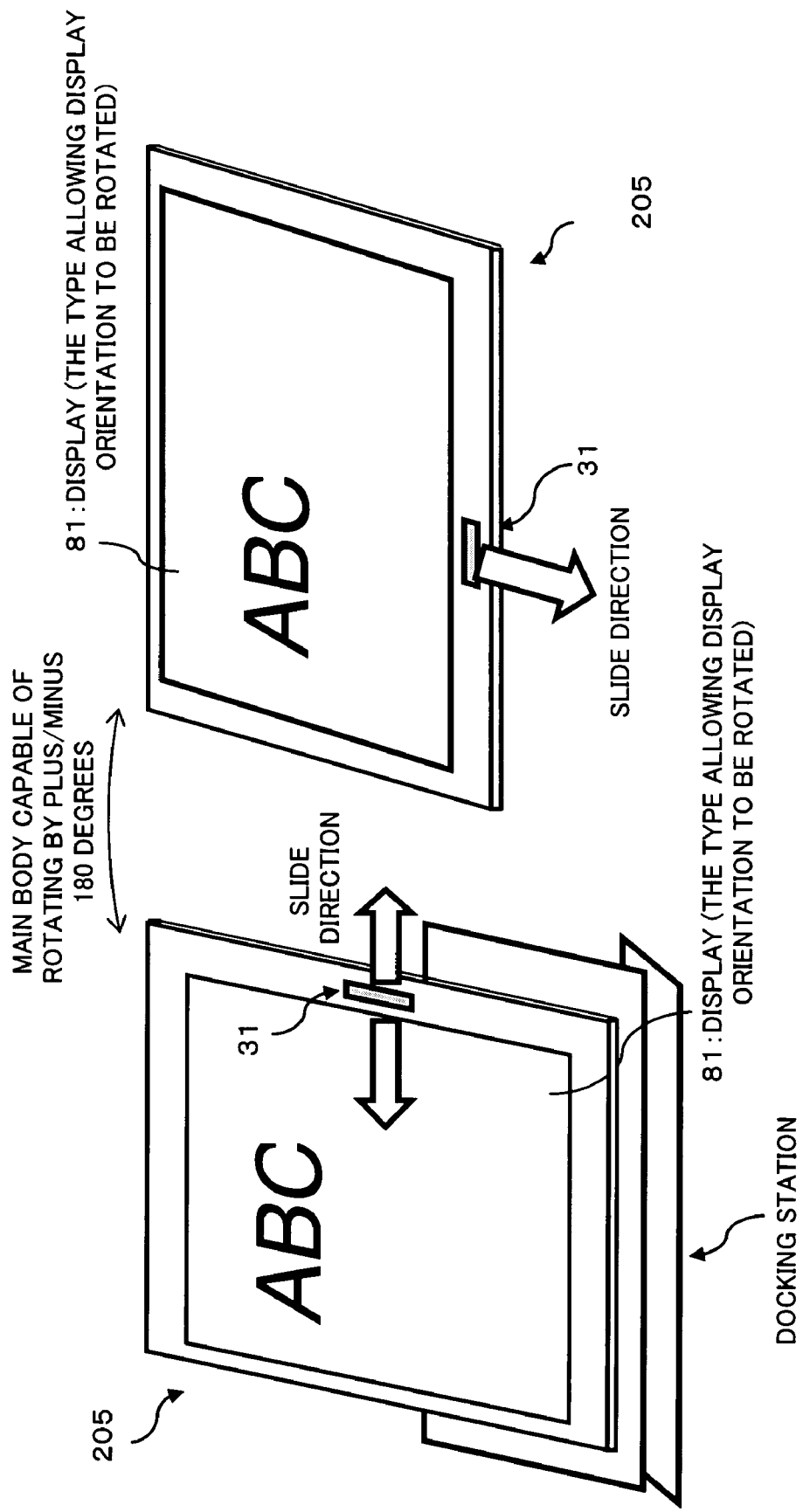

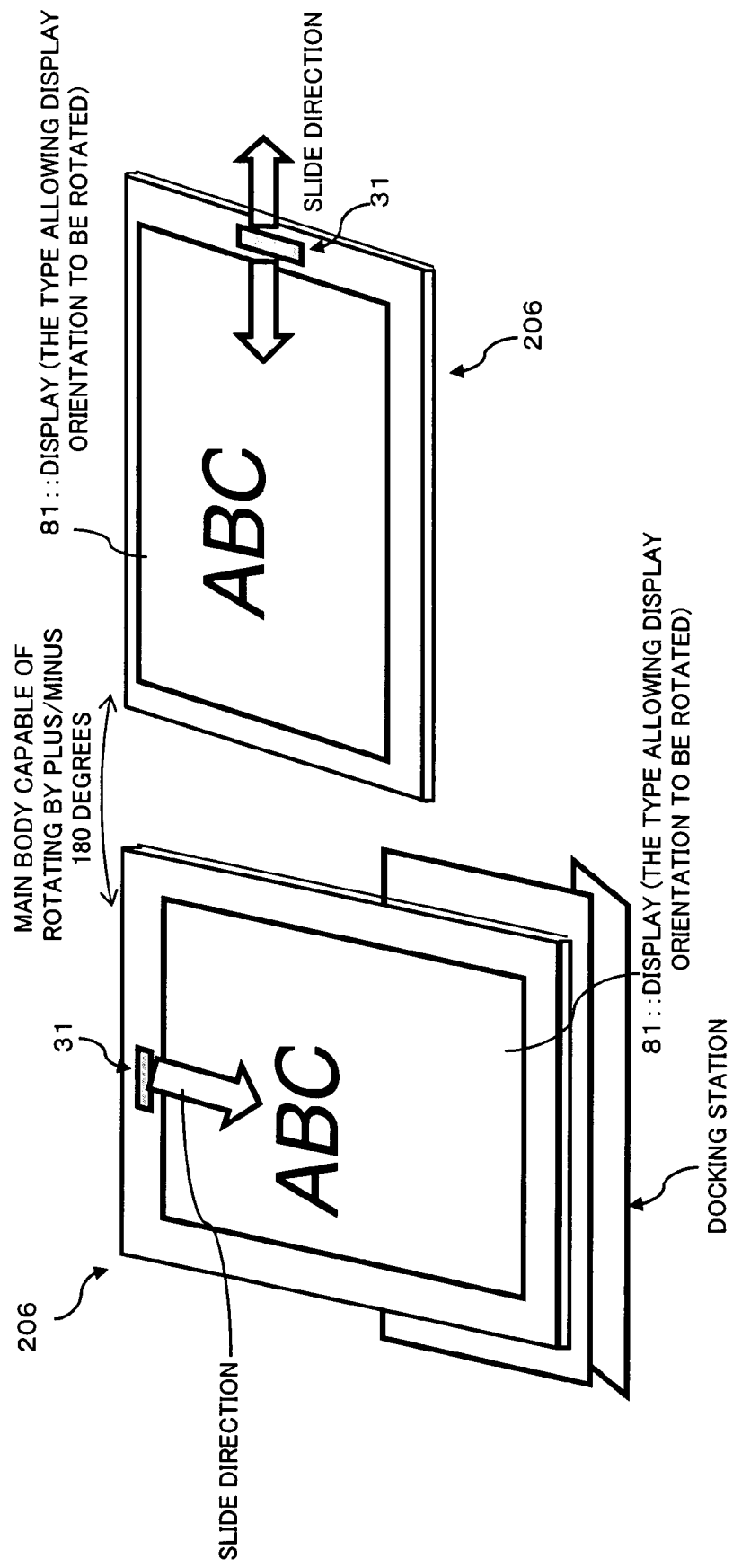

BIOMETRIC INFORMATION INPUT DEVICE, BIOMETRIC AUTHENTICATION DEVICE, BIOMETRIC INFORMATION PROCESSING METHOD, AND COMPUTER-READABLE RECORDING MEDIUM RECORDING BIOMETRIC INFORMATION PROCESSING PROGRAM

BACKGROUND OF THE INVENTION

1. Field of the Invention

The present invention relates to a technology for processing biometric information input for authentication, and particularly to a method for partially and successively collecting biometric information.

2. Description of the Related Art

In a common biometric authentication device, biometric data (enrollment data) is previously prepared (recorded) from biometric information and further biometric data (matching data) is created from biometric information to be authenticated, and then, the matching data is compared to the enrollment data for authentication.

For biometric authentication, biometric information that is common to all persons and consistent throughout the lifetime of a person (e.g., fingerprint, palm print, finger vein, palm vein, etc.) is used, but there are problematic situations in which authentication fails due to various factors.

Further, such authentication failures can be grouped into two major factors. The first factor is that although both enrollment data and matching data are related to the same person, the person is falsely identified as a different person and such case is called "false rejection". The second factor is that although enrollment data and matching data are related to a different person than a person himself/herself, the different person is falsely identified as the person himself/herself and such case is called "false acceptance".

Further, conventionally, a variety of methods for matching biometric information have been put into practice, however, in some of those methods, authentication sometimes fails due to rotational displacement of biometric information. That is, when the degree of freedom which is of the rotation of a living body relative to a biometric information input device, or vice versa, is large, rotational displacement exceeds an acceptable range for a matching method and false rejection rate increases. Moreover, although a method for repeating matching while rotating matching data or enrollment data, in order to accommodate the degree of freedom in the rotational direction, has been also known, rotating the matching data or enrollment data sometimes causes matching data and enrollment data corresponding to different persons to accidentally match, leading to an increase in false acceptance rate.

A sweep fingerprint sensor has been known as a biometric information input device. The sweep fingerprint sensor has a rectangular collection surface (sensor surface/capturing surface) of a small size and with a length substantially shorter than that of a finger. Further, while a finger is moved relative to the collection surface or the collection surface (fingerprint sensor) is moved relative to the finger, a plurality of partial images of a fingerprint of the finger are successively collected by a fingerprint sensor and a total fingerprint image is reconstructed by the collected partial images. Minutia information (ridge bifurcation and ending) is extracted and created from the reconstructed fingerprint image and the above personal authentication is performed based on the information. Note that relative movement of finger to the collection surface as described above is called "sweeping" or "sliding".

A fingerprint reading device provided with such a sweep fingerprint sensor is disclosed, for example, in the following Patent Documents 1, 2. Further, a method for reconstructing a fingerprint image using the amount of parallel movement and the amount of rotational movement detected by the sweep fingerprint sensor is disclosed in the following Patent Document 3.

As disclosed in the following Patent Documents 1 to 3, the sweep fingerprint sensor operates so that relative position of a sensor and a finger is changed and then the partial images of the finger are input to the sensor in order. Note that hereinafter, operation of changing the relative position of a sensor and a finger is called "sliding" and a direction (movement direction of finger) in which the relative position is changed is called "slide direction". Typically, the sweep fingerprint sensor causes a finger to slide relative to the sensor toward the front side (the side of a subject to be authenticated), during which the sensor successively acquires partial images of the finger.

For example, the above Patent Document 3 discloses a method for detecting the slide direction and when the detected slide direction is opposite to a previously expected direction, interrupting input of fingerprint images. That is, a conventional fingerprint image input device imposes a restriction on the slide direction.

[Patent Document 1]
Japanese Patent Laid-Open No. Hei 10-91769
[Patent Document 2]
Japanese Patent Laid-Open No. Hei 11-253428
[Patent Document 3]
Japanese Patent Laid-Open No. 2004-110438

Recently, some of portable information processing devices provided with a sweep fingerprint sensor and typified by laptop PC (Personal Computer), PDAs (Personal Digital Assistants), portable phone and the like are tailored to be used, oriented in the up/down direction or left/right direction.

However, in such a conventional information processing device, when a fingerprint image is input using a sweep fingerprint sensor, the device has to cause a finger to slide in the previously expected direction and therefore needs to rotate itself to read a fingerprint, thereby disadvantageously increasing the degree of complexity. Further, in a fingerprint image input device provided with as a sweep fingerprint sensor that utilizes a change in relative position of a sensor and a finger, it is desirable to cause the sensor to be much more insensitive to the rotational displacement of a fingerprint image due to the slide movement of the finger.

Moreover, detection of the slide direction in the sweep fingerprint sensor is achieved by comparing a plurality of successive partial images acquired by the sensor and calculating a relative position corresponding to the largest degree of overlap. However, the sensor needs to acquire the partial images in a shorter time interval so that the images are overlapped one another even when a finger slides quickly, which imposes a heavy load on the sensor to detect the slide direction. That is, a series of processing steps requiring a large amount of calculations are performed as follows. For example, the relative position of a sensor and a finger is shifted little by little and the degree of overlap in an overlap area of the images is determined, and then, the slide direction is detected based on the relative position corresponding to the largest degree of overlap. Therefore, there is also a problematic situation in which the sensor needs to efficiently detect the slide direction.

Additionally, an authentication technology using biometric information utilizes, as biometric information, a site typified by a body site such as a fingerprint having characteristics common to all persons and consistent throughout the lifetime of a person. However, even such biometric information could not cause a person to be identified as the person himself/herself in the event where different sites are input when enrolled and matched. This requires the biometric information input device to increase reproducibility of a position on which biometric information will be input.

In order to increase the reproducibility of a position on which biometric information will be input, it is useful to allow a user to view, for confirmation, the input biometric information image. However, in a device tailored to be used, oriented in an up/down or left/right direction, biometric information image to be input is displaced in the rotational direction, potentially preventing the user from viewing, for confirmation, the image information. Accordingly, this also requires the device to display biometric information image so that rotation of the device never affects the display of the biometric information image.

Further, for example, if biometric information image is read and a finger placed on the sensor is displaced significantly from the center of the sensor, it is proposed that the device indicates an instruction as a message, for example, "move your finger closer to the right" to a user and instructs the user's finger to move to an appropriate position on the sensor. However, for example, in a device provided with a fingerprint sensor that can be used, oriented in the up/down direction, a direction viewed from the device and a direction viewed from the user are opposite in such an upside down position of the sensor and therefore the device has to take into account the status, etc., (orientation, pointing direction) of the device in order to instruct the user to move his/her finger in the proper direction, which imposes an additional task on the device.

Further, it could also be proposed that a sweep fingerprint sensor is used as a pointing device. However, in a device that can be used, oriented in an up/down or left/right direction, when a sweep fingerprint sensor is used as a pointing device, a direction viewed from the device and a direction viewed from a user are different and therefore direction information detected using a pointing function is sometimes displaced from a direction the user inputs.

SUMMARY OF THE INVENTION

The invention has been conceived in consideration of those problems and is intended to allow a biometric information input device to be used irrespective of a direction in which a living body slides when biometric information is input.

Accordingly, a biometric information input device of the invention is characterized in that the device includes biometric information collection means for reading a relatively-moving living body site and successively collecting a plurality of partial images of the living body site as biometric information; movement direction detection means for detecting a movement direction of the living body site with respect to the biometric information collection means based on the biometric information collected by the biometric information collection means; and coordinate conversion means for performing a coordinate conversion on the biometric information collected by the biometric information collection means using the movement direction detected by the movement direction detection means.

Note that the device may include movement direction search range reduction means for, when the same movement direction has been successively detected by the movement direction detection means, reducing a movement direction search range defined as a range over which the movement direction detection means detects the movement direction to a predetermined range including the detected movement direction.

Further, the device may include movement stop detection means for detecting a stop of movement of the living body site, wherein when the stop of movement of the living body site has been detected by the movement stop detection means, input of the biometric information is stopped.

Still further, the device may include biometric information display means for displaying biometric information coordinate-converted by the coordinate conversion means.

Moreover, a biometric authentication device of the invention is characterized in that the device includes biometric information collection means for reading a relatively-moving living body site to be authenticated and successively collecting a plurality of partial images of the living body site as biometric information; movement direction detection means for detecting a movement direction of the living body site with respect to the biometric information collection means based on the biometric information collected by the biometric information collection means; coordinate conversion means for performing a coordinate conversion on the biometric information collected by the biometric information collection means using the movement direction detected by the movement direction detection means; and authentication means for performing authentication on the living body site to be authenticated using results of the coordinate conversion by the coordinate conversion means.

Note that the device may include movement direction search range reduction means for, when the same movement direction has been successively detected by the movement direction detection means, reducing a movement direction search range defined as a range over which the movement direction detection means detects the movement direction to a predetermined range including the detected movement direction.

Further, the device may include movement stop detection means for detecting a stop of movement of the living body site, wherein when the stop of movement of the living body site has been detected by the movement stop detection means, input of the biometric information is stopped.

Still further, the device may display biometric information coordinate-converted by the coordinate conversion means.

Moreover, a biometric information processing method of the invention characterized in that the method includes the steps of: a biometric information collection step of reading a relatively-moving living body site by means of biometric information collection means and successively collecting a plurality of partial images of the living body site as biometric information; a movement direction detection step of detecting a movement direction of the living body site with respect to the biometric information collection means based on the biometric information collected in the biometric information collection step; and a coordinate conversion step of performing a coordinate conversion on the biometric information collected by the biometric information collection means using the movement direction detected in the movement direction detection step.

Note that the method may include a movement direction search range reduction step of, when the same movement direction has been successively detected in the movement direction detection step, reducing a movement direction search range defined as a range over which the movement direction is detected in the movement direction detection step to a predetermined range including the detected movement direction.

Further, the method may include a movement stop detection step of detecting a stop of movement of the living body site and a stop step of, when the stop of movement of the living body site has been detected in the movement stop detection step, stopping input of the biometric information.

Still further, the method may include a biometric information display step of displaying biometric information coordinate-converted by the coordinate conversion means on display means.

Additionally, a biometric information processing program of the invention is characterized in that the program causes a computer to perform the steps of: a biometric information collection step of reading a relatively-moving living body site by means of biometric information collection means and successively collecting a plurality of partial images of the living body site as biometric information; a movement direction detection step of detecting a movement direction of the living body site with respect to the biometric information collection means based on the biometric information collected in the biometric information collection step; and a coordinate conversion step of performing a coordinate conversion on the biometric information collected by the biometric information collection means using the movement direction detected in the movement direction detection step.

Note that the program may cause the computer to perform a movement direction search range reduction step of, when the computer is caused to perform the movement direction detection step and the same movement direction has been successively detected, reducing a movement direction search range defined as a range over which the movement direction is detected in the movement direction detection step to a predetermined range including the detected movement direction.

Further, the program may cause the computer to perform a movement stop detection step of detecting a stop of movement of the living body site and a stop step of, when the stop of movement of the living body site has been detected in the movement stop detection step, stopping input of the biometric information.

Still further, the program may cause the computer to perform a biometric information display step of displaying biometric information coordinate-converted by the coordinate conversion means on display means.

Additionally, a computer readable recording medium of the invention is characterized in that the medium causes a computer to perform the steps of: a biometric information collection step of reading a relatively-moving living body site by means of biometric information collection means and successively collecting a plurality of partial images of the living body site as biometric information; a movement direction detection step of detecting a movement direction of the living body site with respect to the biometric information collection means based on the biometric information collected in the biometric information collection step; and a coordinate conversion step of performing a coordinate conversion on the biometric information collected by the biometric information collection means using the movement direction detected in the movement direction detection step.

Note that the biometric information processing program may cause the computer to perform a movement direction search range reduction step of, when the computer is caused to perform the movement direction detection step and the same movement direction has been successively detected, reducing a movement direction search range defined as a range over which the movement direction is detected in the movement direction detection step to a predetermined range including the detected movement direction.

Further, the biometric information processing program may cause the computer to perform a movement stop detection step of detecting a stop of movement of the living body site and a stop step of, when the stop of movement of the living body site has been detected in the movement stop detection step, stopping input of the biometric information.

Still further, the biometric information processing program may cause the computer to perform a biometric information display step of displaying biometric information coordinate-converted by the coordinate conversion means on display means.

According to the invention, since the coordinate conversion means performs a coordinate conversion on the collected biometric information based on the movement direction detected by the movement direction detection means from the biometric information, even when an angular difference (rotational displacement) between the biometric information collection means and the slide direction of a living body occurs at the time of collection of biometric information, the rotational direction can be corrected, allowing an upright image to be reliably obtained. This allows an upright image to be reliably obtained even when the slide direction changes each time a living body slides and a rotational displacement from one biometric information to another is observed.

Further, biometric information image can be obtained as an upright image even if the biometric information is collected when the orientation of the biometric information collection means is changed, for example, the biometric authentication device is rotated and used in an upside down position, and the biometric information can be collected irrespective of the orientation of the device, thereby allowing the device to be highly convenient.

Additionally, even when the display means is caused to display the collected biometric information, the biometric information can be acquired as an upright image irrespective of the direction (orientation) of the device, display means, and biometric information collection means, etc., and therefore there is no need to detect and determine the direction (orientation) of the device, display means, and biometric information collection means, etc., thereby eliminating the need for functions to perform such detection and determination and reducing manufacturing cost.

Further, the degree of freedom of the mounting direction of the biometric information collection means can be made high and reduction in the mounting area of a wiring pattern leads to reduction in the volume and price of the device.

BRIEF DESCRIPTION OF THE DRAWINGS

FIG. 3 is a diagram illustrating an example of a movement direction initial search range in the fingerprint authentication device as one embodiment of the invention;

FIG. 4 is a diagram illustrating an example of the movement direction initial search range in the fingerprint authentication device as one embodiment of the invention;

FIGS. 12(a), 12(b) both are diagrams illustrating an example of appearance of the authentication device as one embodiment of the invention;

FIGS. 13(a), 13(b) are diagrams to explain an instruction direction displayed on a display of the authentication device as one embodiment of the invention;

FIGS. 23(a), 23(b), 23(c) are diagrams illustrating examples in which the fingerprint authentication device of the invention is applied to a mobile device (mobile phone) provided with a sweep fingerprint sensor;

FIGS. 25(a), 25(b) are diagrams illustrating examples in which the fingerprint authentication device of the invention is applied to a mobile device (PDA: Personal Digital Assistants) provided with a sweep fingerprint sensor;

FIGS. 26(a), 26(b) are diagrams illustrating examples in which the fingerprint authentication device of the invention is applied to a mobile device (PDA) provided with the sweep fingerprint sensor;

FIGS. 28(a), 28(b) are diagrams illustrating examples in which the fingerprint authentication device of the invention is applied to a mobile device (laptop PC (Personal Computer)) provided with the sweep fingerprint sensor;

FIGS. 29(a), 29(b) are diagrams illustrating examples in which the fingerprint authentication device of the invention is applied to a mobile device (tablet PC) provided with the sweep fingerprint sensor; and FIGS. 30(a), 30(b) are diagrams illustrating examples in which the fingerprint authentication device of the invention is applied to a mobile device (tablet PC) provided with the sweep fingerprint sensor.

DETAILED DESCRIPTION OF THE PREFERRED EMBODIMENTS

Embodiments of the invention will be explained below with reference to the accompanying drawings.

(A) Explanation of Embodiments

Figure 1:
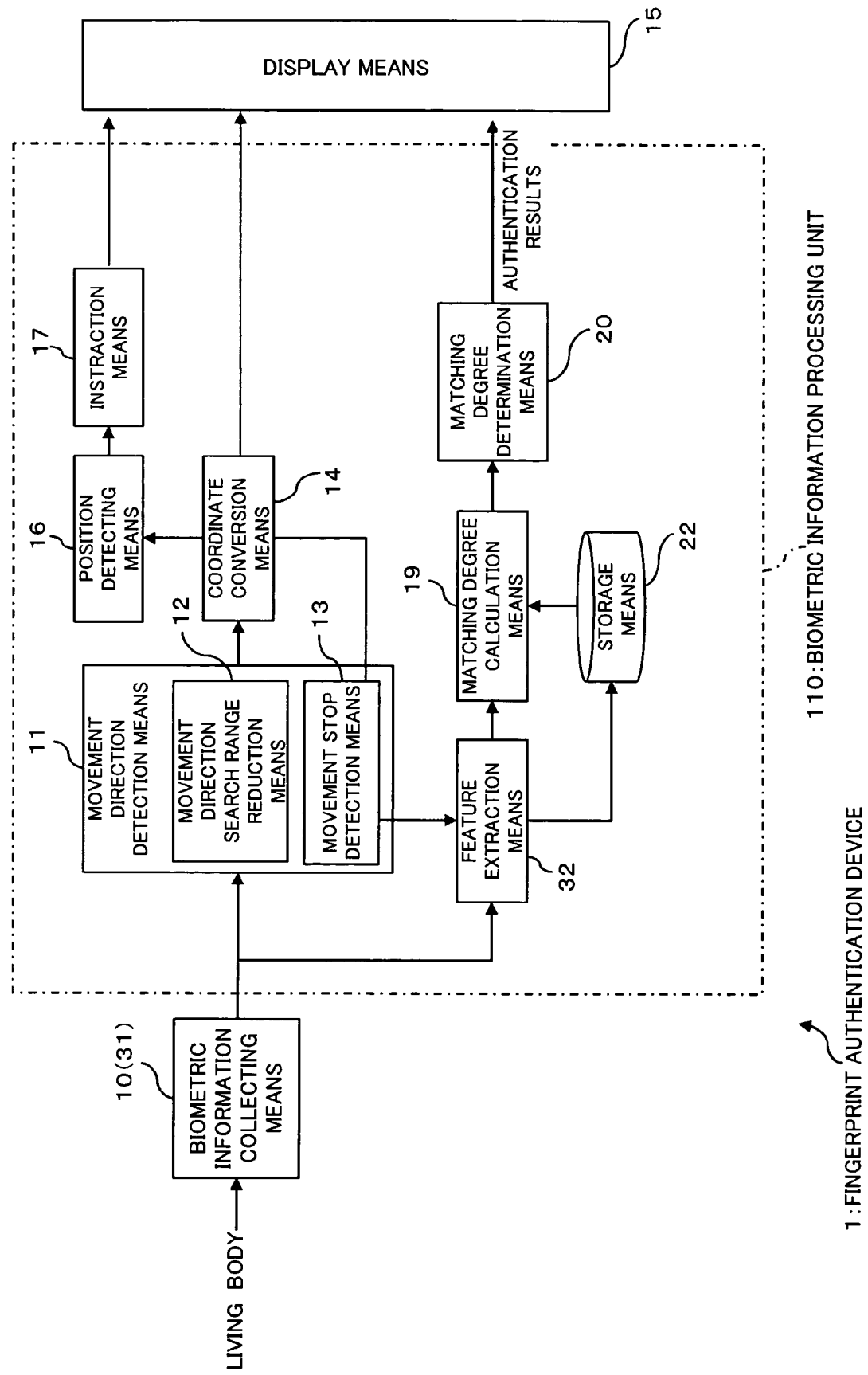
FIG. 1 is a block diagram illustrating a function configuration (principal configuration) of a fingerprint authentication device as one embodiment of the invention.
Figure 2:
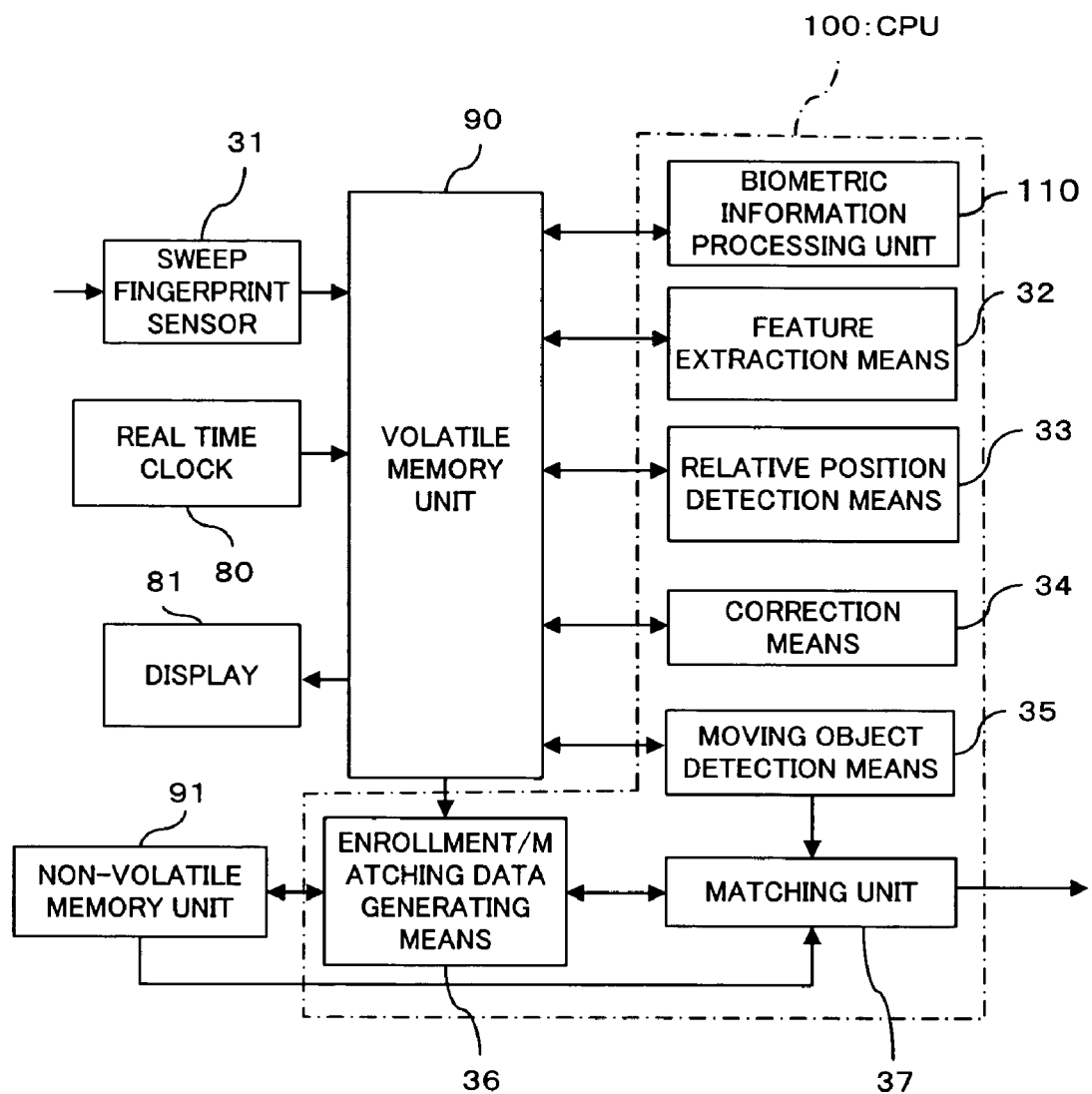
FIG. 2 is a block diagram illustrating a detailed configuration of the fingerprint authentication device as one embodiment of the invention.

Both FIGS. 1 and 2 illustrate a fingerprint authentication device (biometric information input device) as one embodiment of the invention and FIG. 1 is a block diagram illustrating a function configuration (principal configuration) of the device and FIG. 2 is a block diagram illustrating a detailed configuration thereof, where the same numerals are used to designate the same elements.

Examples of biometric information primarily include a fingerprint, palm print, finger vein, palm vein, etc., and in this embodiment, a device using an image of fingerprint as biometric information will be explained.

As shown in FIG. 1, a fingerprint authentication device 1 has functions as biometric information collection means 10 and biometric information processing unit 110, and the biometric information processing unit 110 has functions as movement direction detection means 11, coordinate conversion means 14, position detection means 16, instruction means 17, feature extraction means 32, matching degree calculation means 19, matching degree determination means 20, biometric information central position detection means 21, and storage means 22.

In practice, as shown in FIG. 2, the fingerprint authentication device 1 of this embodiment is implemented by providing a sweep fingerprint sensor 31 as biometric information collection means 10 to a typical personal computer, etc., that includes, for example, a real time clock 80, volatile memory unit 90, non-volatile memory unit 91 (storage means 22), display 81 (display means 15), and CPU (Central Processing Unit) 100.

In this case, later described functions as biometric information processing unit 110 (movement direction detection means 11, coordinate conversion means 14, position detection means 16, instruction means 17, feature extraction means 32, matching degree calculation means 19, matching degree determination means 20), feature extraction means 32, relative position detection means 33, correction means 34, moving object detection means 35, enrollment/matching data generating unit (generating means) 36, and matching unit (matching degree calculation means 19, matching degree determination means 20) 37 are implemented by running a predetermined program (biometric information processing program) on the CPU 100.

The sweep fingerprint sensor 31 (biometric information collection means 10) is for visualizing biometric information of a subject to be authenticated and successively collecting a plurality of partial images (biometric information image) corresponding to the biometric information (fingerprint). In more detail, the sensor operates so that the sensor causes a finger (living body site) of the subject to move relative to a collection surface (sensor surface) while contacting the surface and successively collects partial images of fingerprint of the finger, in order to read the living body site during relative movement of the site and successively collect a plurality of two-dimensionally arranged partial images related to the living body site as biometric information. Note that hereinafter, the sweep fingerprint sensor 31 is also referred to as a fingerprint sensor 31 for simplification.

It should be appreciated that a method for collecting a fingerprint image in the fingerprint sensor 31 may be implemented, for example, by any one of an electrostatic capacitance method, thermal sensing method, electric field method, and optical method.

A fingerprint is being formed on outer skin (finger: living body site) of a subject to be authenticated and the print pattern of the fingerprint consists of a ridge (contact part) probably brought into contact with the sensor surface and a valley (non-contacting part/gap part) kept out of contact with the sensor surface. The fingerprint sensor 31 utilizes a difference in its sensitivity to a ridge part in contact with the sensor surface and a valley part out of contact with the sensor surface and collects partial fingerprint images as a multilevel image. The multilevel image has different brightness varying depending on a distance from the sensor, i.e., typically, the ridge part closer to the sensor is displayed with a lower brightness and the valley part relatively farther from the sensor is displayed with a higher brightness.

When requesting fingerprint authentication, the subject moves his/her finger in an optional direction, for example, moves the finger from bottom side to fingertip side or from finger's right side to left side, while touching the sensor surface of the fingerprint sensor 31 with his/her finger. Note that when the device is provided with a mechanism for moving the fingerprint sensor 31 relative to a finger, the subject needs not to move his/her finger. Hereinafter, in this embodiment, the case where the subject slides his/her finger from finger's bottom side to tip side will be explained. Note that the configuration of the fingerprint sensor 31 is well known in the art and therefore detailed explanation thereof is omitted.

The real time clock 80 is used to add a time stamp to each of the partial images successively collected by the fingerprint sensor 31. Note that the real time clock 80 is not necessarily provided when a certain time interval in which images are acquired by the fingerprint sensor 31 is previously known and sufficiently constant so as to allow ignorance of an error in the time interval.

The volatile memory unit 90 is for storing information such as partial images successively collected by the fingerprint sensor 31, characteristics, relative positions and post-correction results obtained by the function of the CPU 100, and various types of numerical values, needed to allow the CPU 100 to implement functions as a fingerprint authentication device of this embodiment.

The non-volatile memory unit 91 is for retaining previously enrolled fingerprint data (enrollment data) related to the subject and functioning as the storage means 22 in FIG. 1. The fingerprint data retained in the non-volatile memory unit 91 could be the one extracted from a fingerprint image collected by the typical fingerprint sensor with a sensor surface larger than the size of a finger, or enrollment data generated by the enrollment/matching data generating unit 36 of this embodiment.

The display 81 (display means 15) is for displaying a variety of images and information, functioning as biometric information display means displaying biometric information coordinate-converted by later-described coordinate conversion means 14, and further, displaying instruction given by the later-described instruction means 17 to a user (subject).

The biometric information processing unit 110 is for processing partial fingerprint images (biometric information) collected by the fingerprint sensor 31 and has functions as movement direction detection means 11, coordinate conversion means 14, position detection means 16, instruction means 17, feature extraction means 32, matching degree calculation means 19, matching degree determination means 20, and biometric information central position detection means 21.

The movement direction detection means 11 is for detecting a movement direction of a finger with respect to the fingerprint sensor 31, based on partial fingerprint images collected by the fingerprint sensor 31.

Further, the movement direction detection means 11 has functions as movement direction search range reduction means 12 and movement stop detection means 13. The movement direction search range reduction means 12 is for reducing a movement direction search range defined as a range over which a movement direction is detected by the movement direction detection means 11, from a previously set movement direction initial search range to a predetermined range including the detected movement direction, when the same movement direction has been successively detected by the movement direction detection means 11.

FIGS. 3 and 4 are diagrams illustrating an example of a movement direction initial search range in the fingerprint authentication device 1 as one embodiment of the invention, wherein a partial fingerprint image (denoted by a dashed line) detected at time T-ΔT by the fingerprint sensor 31 and the partial fingerprint image (denoted by a solid line) detected after time ΔT has elapsed since then (at time T) are illustrated, respectively, along with the movement direction initial search range (denoted by a chain line) at time T.

That is, FIG. 3 and FIG. 4 are used to explain a range over which one of the two fingerprint image is moved so that a position with which the one fingerprint image is caused to overlap is moved little by little in order to find a position in which two fingerprint images corresponding to the same site just overlap with each other, and in particular, to indicate the movement direction initial search range. Note that an arrow drawn from the center of the biometric information image collected at time T-ΔT to the center of the biometric information image collected at time T represents a movement direction.

Note that FIG. 3 illustrates an example in which the movement direction initial search range is in all directions (360 degrees) and centered on the fingerprint image (square in shape) collected by the fingerprint sensor 31. In the example shown in FIG. 3, the fingerprint sensor 31 is substantially square in shape and the initial search range is set to 360 degrees when a movement direction of a finger is not determined in an initial state. In the example shown in FIG. 3, a maximum range for the movement direction initial search range is Sx-Oxmin and Sy-Oymin in x-axis and y-axis directions, respectively.

Note that Sy and Sx indicate sizes of the partial fingerprint images in x-axis and y-axis directions, respectively, when horizontal direction and vertical direction axes are defined as x-axis and y-axis, respectively, for the partial fingerprint image. Further, Oymin and Oxmin indicate sizes of a minimum necessary area in y-axis and x-axis directions, respectively, which area allows the sensor to determine that corresponding images overlap with each other.

Further, FIG. 4 illustrates an example in which the movement direction initial search range is in a minor axis direction (up/down direction in FIG. 4) and centered on the fingerprint image (rectangle in shape) collected by the fingerprint sensor 31. In the example shown in FIG. 4, when the fingerprint sensor 31 is rectangle in shape and the movement direction of a living body is limited to the up/down direction in the initial state, the initial search range is set to the up/down direction with respect to the partial fingerprint image and cascade directions with respect to the same.

A positional relationship between the respective images in FIGS. 3 and 4 reflects a positional relationship between the finger of a subject to be authenticated and the fingerprint sensor 31 during the elapsed time $\Delta T$ between collection times corresponding to the partial fingerprint images. For example, the positional relationship represents a situation in which fingerprint images are successively acquired when a finger is caused to slide on the fingerprint sensor 31. That is, since a relative position of the finger and the fingerprint sensor 31 is moving from time to time, the fingerprint images collected at times T-$\Delta T$ and T, respectively, are the ones visualizing the sites that are slightly displaced from one another.

Figure 5:
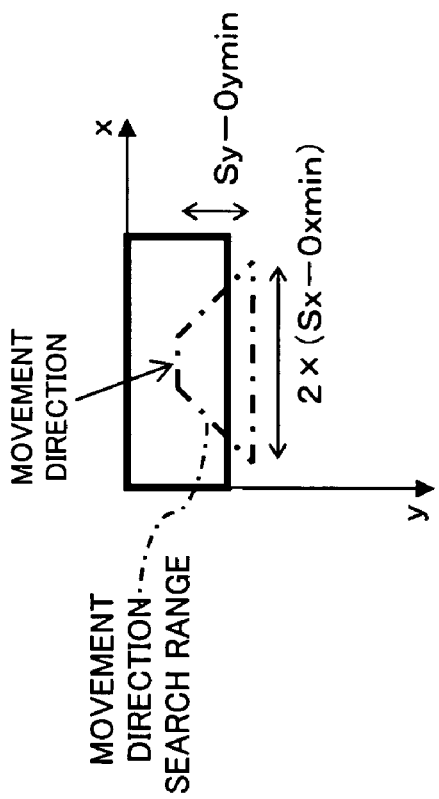
FIG. 5 is a diagram illustrating another example of the movement direction initial search range in the fingerprint authentication device as one embodiment of the invention.
Figure 6:
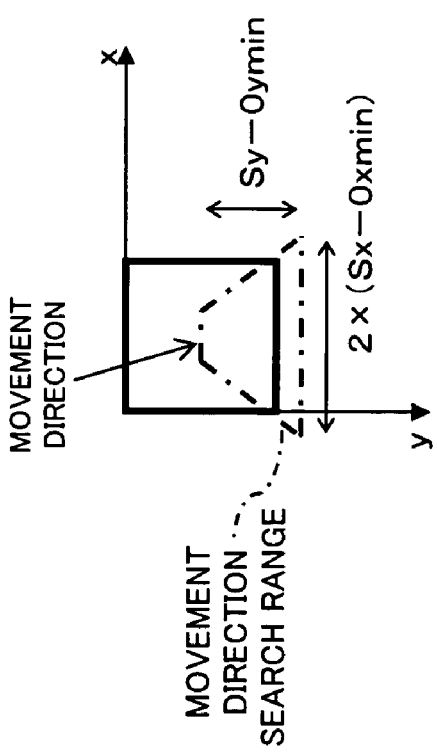
FIG. 6 is a diagram illustrating another example of the movement direction initial search range in the fingerprint authentication device as one embodiment of the invention.

Further, FIGS. 5 and 6 each are diagrams illustrating another example of a movement direction initial search range in the fingerprint authentication device 1 as one embodiment of the invention and indicate situations in which the movement direction initial search ranges shown in FIGS. 5 and 6, respectively, are reduced (limited) to the downward direction. Note that in FIGS. 5 and 6, illustration of the biometric information image collected at time T-$\Delta T$ is omitted.

Figure 7:
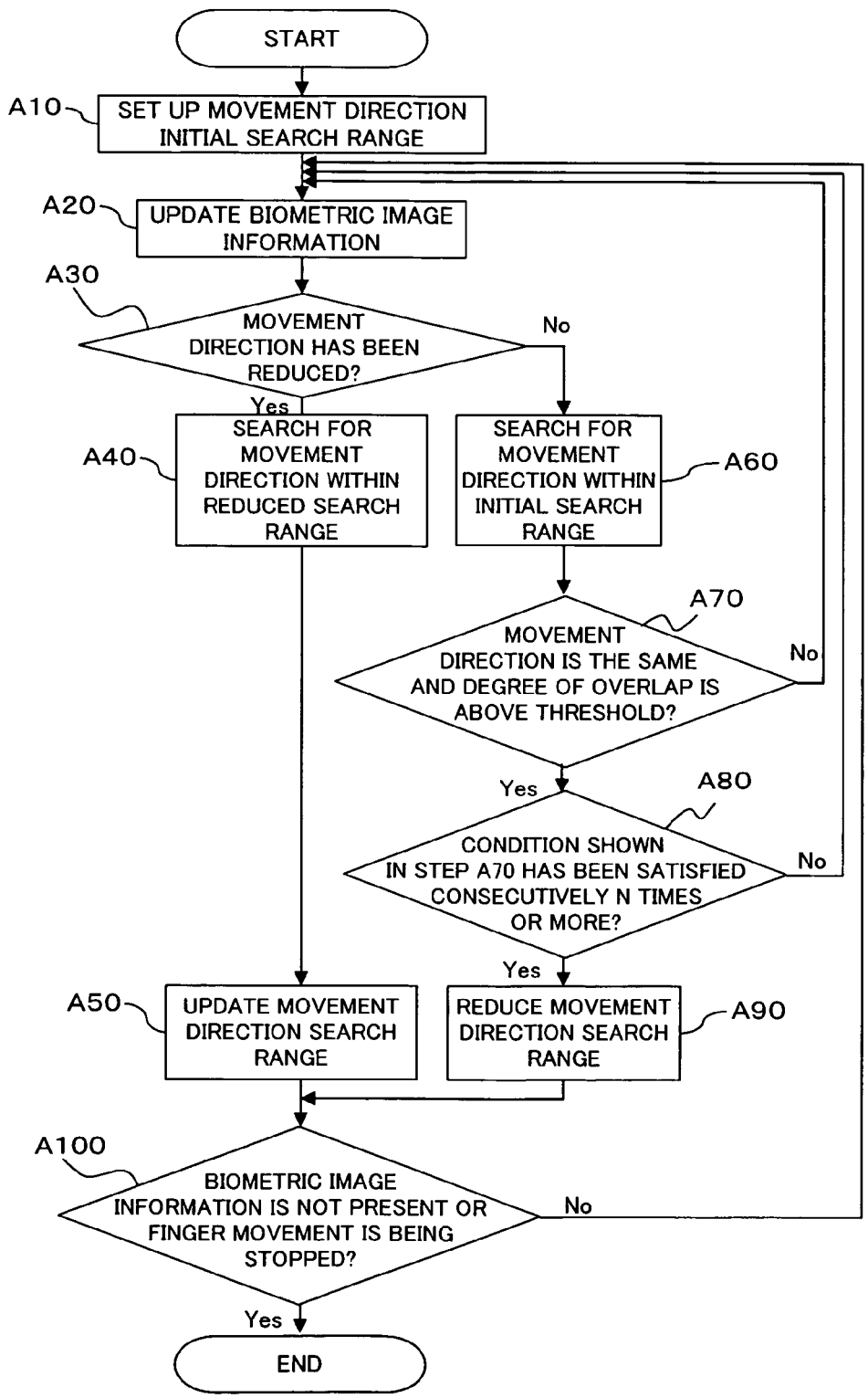
FIG. 7 is a flow chart to explain how the movement direction search range is set up in the fingerprint authentication device as one embodiment of the invention.

Then, how to set up the movement direction search range in the fingerprint authentication device 1 as one embodiment of the invention will be explained with reference to a flow chart (steps A10 to A100) shown in FIG. 7.

First, a movement direction initial search range is set up (step A10). The movement direction initial search range is previously set up based on the slide direction in which the subject potentially slides his/her finger with respect to the fingerprint sensor 31 and determined depending on, for example, how this fingerprint authentication device 1 is used and positions to which the fingerprint sensor 31 is attached. Note that when the slide direction on the fingerprint sensor 31 is not determined, it is desirable to set up a wide movement direction initial search range, as shown in FIGS. 3 and 4.

Next, partial fingerprint images are collected by the fingerprint sensor 31 in order to update biometric information image (step A20). Then, whether or not the movement direction search range has been reduced is determined (step A30). In more detail, whether or not a flag indicating that the movement direction search range has been reduced is set to ON will be determined in later described step A90. When the movement direction search range has not been reduced (refer to NO route at step A30), a movement direction is searched within the initial search range (step A60).

That is, regarding a plurality of partial images successively collected by the fingerprint sensor 31, whether or not the movement directions are successively the same, i.e., whether or not a finger moves in the same direction with respect to the fingerprint sensor 31 is examined, and simultaneously, whether or not the degree of overlap is above a predetermined threshold is determined (step A70). Note that the degree of overlap implies the degree of correlation or the degree of matching.

Now, the threshold used in step A70 will be explained. When a subpixel error is present, images cannot be completely overlapped with each other and therefore the degree of overlap is affected and its value is reduced. In this case, since a fingerprint represents projections and depressions, i.e., ridges and valleys on a finger skin and the finger skin is soft, pressing a finger against the sensor causes some distortion. Further, because the fingerprint image is read during pressing of a finger against the sensor, the distortion continuously changes. The degree of overlap is affected also when the distortion occurs and its value is reduced. Various other factors cause the degree of overlap to decrease and therefore the extent to which the degree of overlap is reduced is experimentally and analytically determined and then the threshold is determined.

Additionally, the subpixel error is an error of less than one pixel in a movement distance, caused by the quantization error of an image. Although biometric information is digitized when the information is converted to an image, the digitizing in practice causes successive information to be decimated into discrete information. In more detail, for example, when an image represented by pixels spaced at a pitch of 50 micrometers and a movement distance an object is less than 50 micrometers, the amount of movement is in practice below one pixel.

However, when the sensor attempts to detect a movement distance, one image that is caused to overlap the other is moved only in units of pixels and therefore a movement distance less than one pixel becomes equal to either one pixel or zero pixel. For example, when an image comprised of pixels spaced at a pitch of 50 micrometers and the movement distance is 30 micrometers, the distance is in practice determined to be one pixel rather than 0.6 pixels. In this case, an error of 0.4 pixel occurs and such an error is referred to as a subpixel error.

Next, when the movement direction is kept unchanged and the degree of overlap is not less than the threshold (refer to YES route at step A70), whether or not a condition shown in step A70 has been satisfied consecutively N times or more is determined (step A80). When the above condition has been satisfied consecutively N times or more (refer to YES route at step A80), it is determined that a finger is stably moving in the same direction and the movement direction search range reduction means 12 reduces (limits) the movement direction search range to a predetermined range including its movement direction (step A90), and further sets a flag indicating that the movement direction search range has been reduced to ON.

Moreover, when a finger is not moving in the same direction with respect to the fingerprint sensor 31 or the degree of overlap is less than the predetermined threshold (refer to NO route at step A70), or when the condition shown in step A70 has not been satisfied consecutively N times or more (refer to NO route at step A80), the process returns to step A20.

On the other hand, when the movement direction search range has been reduced (refer to YES route at step A30), a movement direction is searched within the reduced movement direction search range (step A40) and further the movement direction search range is updated so that the range becomes a predetermined range including the movement direction searched in step A40 (step A50).

Subsequently, whether or not any more partial fingerprint image collected by the fingerprint sensor 31 is present, or whether or not finger movement is stopped is determined (step A100). When the partial fingerprint image collected by the fingerprint sensor 31 is not present or the finger movement is stopped (refer to YES route at step A100), the process is terminated. Further, when the partial fingerprint image collected by the fingerprint sensor 31 is present or the finger movement is not stopped (refer to NO route at step A100), the process returns to step A20.

Next, slide speed detectable by this fingerprint authentication device 1 is calculated using the following mathematical relationship (1) in reference to coordinate system used to express a fingerprint image.

$$Vy < R \cdot (Sy - Oymin)/\Delta T, \ Vx < R \cdot (Sx - Oxmin)/\Delta T \quad (1)$$

In this case, when a horizontal direction axis is defined to be x-axis and a vertical direction axis is defined to be y-axis in a partial fingerprint image, Vy and Vx are the y-axis direction component and x-axis direction component of the slide speed, respectively, and R is a pixel pitch. Note that although expanding/contracting distortion and/or skew distortion appears on the partial fingerprint image depending on the slide speed, the above relationship is assumed to be valid in an ideal condition free from such distortions.

Further, Vy and Vx vary depending on the features of a living body to be input and $\Delta T$ varies depending on the performance of the fingerprint sensor 31 and significantly affects determination of specification of the sensor. For example, when the performance of the fingerprint sensor 31 is already fixed and further when Sy and Sx are already determined, Oymin and Oxmin will be experimentally determined.

Additionally, since $\Delta T$ has a lower limit, the upper limit of a detectable slide speed shown in the above relationship (1) is represented by Vy and Vx. For example, when it is assumed that a finger slides only in the y-axis direction, the performance of the fingerprint sensor 31 is such that the lower limit of $\Delta T$ is 3 msec, Oymin is 4 pixels, Sy is 16 pixels, R is 0.05 mm/pixel, and the partial fingerprint image ideally contains no distortion, the upper limit of the slide speed becomes 200 mm/sec.

However, as shown in the above example, the movement direction detection means 11 has to operate following the slide speed of a living body and detect movement directions from hundreds of partial images per second, thereby putting a heavy load on the means. In addition, when it is expected that the fingerprint authentication device 1 is used, for example, in an upside down state, the load is further increased. Therefore, the movement direction detection means 11 utilizes inertia in order to efficiently calculate the slide direction and then achieve reduction in load imposed thereon.

That is, under the assumption that the slide direction does not suddenly change in a short time interval, the detection means determines that the slide direction corresponds to either one of a positive direction or a negative direction along y-axis and since then, limits a search area only within a range including the determined direction in order to detect the slide direction. In the above example, it is hardly expected that for example, a living body or the fingerprint authentication device 1 moving at a speed of 200 mm/sec as the upper limit speed in the slide direction suddenly moves in the opposite direction after 0.003 msec has elapsed.

Further, when reduction of the movement direction search range is performed, it is important that the movement direction is stable. A condition for determining stability of movement direction, used as an example in the case shown in FIG. 7, is such that the movement direction is kept unchanged and the degree of overlap is above a predetermined threshold (see step A70).

Within the movement direction search range, it can be assumed, based on the law of inertia after stabilization of the slide direction, that a finger movement does not suddenly change its direction. Accordingly, for example, the movement direction search range is reduced to a range of the movement direction $\pm a$. Note that the search range may be generally either one of upper/lower and left/right areas.

The movement stop detection means 13 is for detecting a stop of movement of a finger (living body site) on the fingerprint sensor 31. The fingerprint authentication device 1 operates so that when the movement stop detection means 13 has detected the stop of the finger movement of a subject to be authenticated, input of the corresponding partial image is stopped.

As noted above, even if the movement direction search range reduction means 12 reduces or decimates the search range in order to reduce the amount of calculations required for detection of movement direction, monitoring the stop of movement is necessary.

For example, when the fingerprint sensor 31 is a sensor of the type allowing reading of the image (partial image: biometric information) of a fingerprint in the state of subject's finger being in contact with a sensor unit (not shown) and further when the skin of a living body is bent due to friction, etc., a site contacting the sensor unit is, in some cases, hardly moved even if the finger moves. As described above, even when pulling force between the finger (living body) and the fingerprint sensor 31 is created, monitoring the stop of the movement of living body is needed to collect the partial fingerprint image in a condition free from the influence of such pulling force.

Figure 9:
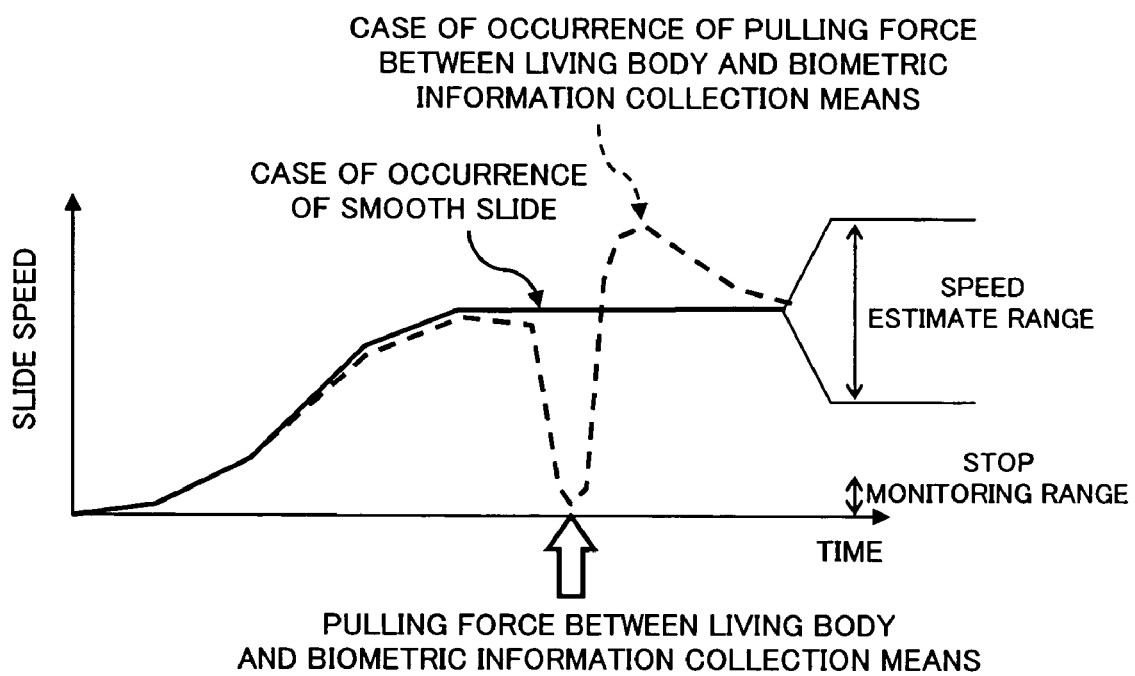
FIG. 9 is a diagram illustrating an example of how slide speed of finger changes during collection of a fingerprint image in a fingerprint sensor.

FIG. 9 is a diagram illustrating an example of how the slide speed of a finger changes during collection of the fingerprint image in the fingerprint sensor 31, in which a solid line indicates the case where a finger smoothly slides and a dashed line indicates the case where pulling force between the finger and fingerprint sensor 31 is created.

As shown in FIG. 9, there are the case where the slide speed smoothly changes and the case where the slide speed largely changes for the fingerprint sensor 31 to collect the fingerprint image. If it can be assumed the slide speed changes smoothly, the movement direction search range is limited to achieve reduction in processing time and prevent erroneous detection. However, when the bending of a skin due to friction between the living body and the sensor occurs, the slide speed of a site contacting the sensor temporarily and instantly becomes zero, as denoted by a dashed line in FIG. 9, even if the living body itself is moving while maintaining a constant speed.

The fingerprint authentication device 1 is configured so that a movement speed estimate range is provided so as to set up a stop monitoring range.

Here, how to set up the movement speed estimate range will be explained. In step A90 (movement direction search range reduction step) previously described with FIG. 7, under the assumption of presence of inertia, speed is estimated using a change in the amount of movement or a change in the slide speed after stabilization of movement direction and the movement direction search range is reduced. Note that similar discussion with respect to x-axis direction and y-axis direction can be made and therefore the slide speed is denoted by V, omitting attachment of a subscript to V.

The slide speed V is apparently calculated using an imaging time interval I(K) and a relative position Pr(K) for a partial image, according to the following equation (2).

$$V(K) = Pr(K)/I(K) \quad (2)$$

In this case, the imaging time interval I(K) means a period of time from when imaging of a certain partial image is initiated to imaging of a subsequent partial image is initiated.

Further, the relative position Pr'(K) assumed to subsequently be detected is calculated according to the following equation (3), using the above equation (2).

$$Pr'(K)=V(K-1)*I(K), K: \text{integer} \qquad (3)$$

When an image collecting time interval is sufficiently short, the search range is considered less than one ridge width, allowing further reduction in the number of computations and reduction in the probability of danger of erroneous detection of the relative position.

Note that when the imaging time interval I(K) can be considered constant regardless of the time of imaging, utilizing the latest relative position Pr(K−1) as it is as shown in the following equation (4) brings about similar actions and effects to those derived from the above equation (3).

$$Pr'(K)=Pr(K-1) \qquad (4)$$

Such an estimate method becomes effective when it can be assumed that a change in the slide speed is very slow and the speed is constant.

When the imaging time interval I(K) can be considered constant and a change in the slide speed is significant, the relative position Pr'(K) may be estimated as in the following equation (5).

$$Pr'(K)=Pr(K-1)+[Pr(K-1)-Pr(K-2)] \qquad (5)$$

The above equation (5) is useful when a speed change [Pr(K−1)−Pr(K−2)], i.e., acceleration can be assumed constant. For example, application of the equation (5) to the case where the slide speed changes so that the speed gradually increases during slide initiation allows the search range to be appropriately set up. Even when the imaging time interval I(K) cannot be considered constant, adding a speed change based on a concept similar to the above mentioned concept allows the search range to be appropriately set up.

Figure 10:
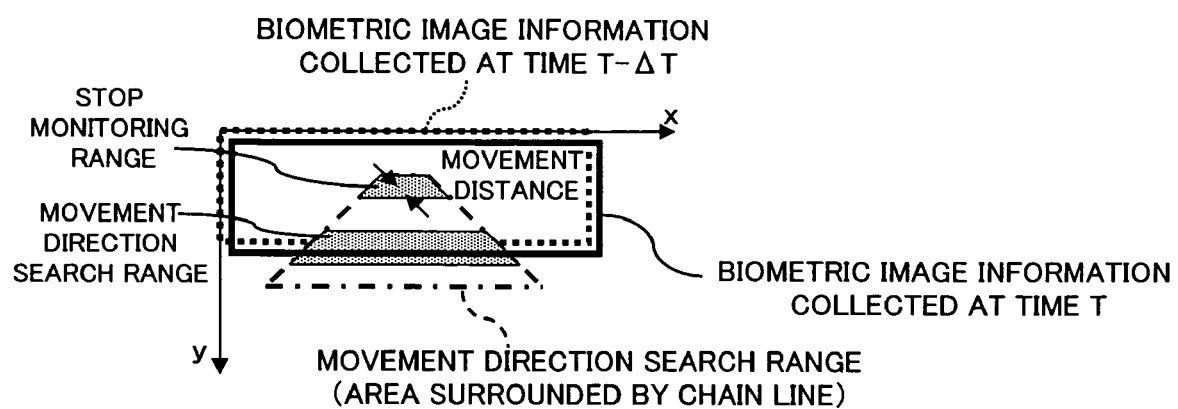
FIG. 10 is a diagram illustrating an example of a stop monitoring range and movement direction initial search range in the fingerprint authentication device as one embodiment of the invention.

FIG. 10 is a diagram illustrating an example of a stop monitoring range and movement direction initial search range in the fingerprint authentication device 1 as one embodiment of the invention, in which the partial image (denoted by a dashed line) of a fingerprint detected at time T-ΔT by the fingerprint sensor 31 and the partial image (denoted by a solid line) of a fingerprint detected after time ΔT has elapsed (at time T) are shown along with the movement direction initial search range (denoted by a chain line) and stop monitoring range at time T.

In FIG. 10, the stop monitoring range and movement direction search range are drawn by superimposing the speed estimate range and stop monitoring range related to the slide speed shown in FIG. 9 on the biometric information image collected at time T-ΔT.

Detection of the slide speed (movement direction and movement distance) takes longer period of time as the search range becomes wider. Accordingly, utilizing the fact that the slide speed can be predicted to some extent based on its latest speed value effectively limits the search range to a narrower range.

However, as shown in FIG. 9, in some cases, friction between a finger and the fingerprint sensor 31 or existence of corners or ledges in a housing around the perimeter of the sensor causes the slide speed to suddenly become zero (pulling force occurs). When such a temporal stop of the slide speed occurs, it is not necessarily assured that the movement direction and movement distance can be properly detected in a narrow search range.

Then, the fingerprint authentication device 1 is configured so that in order to be able to properly detect the movement direction and movement distance of a living body even when the slide speed has suddenly changed to zero, the living body is assumed to be only slightly displaced to a range from a reference position (at the time point shown in the figure) referred to when the movement distance is detected, and then, the range to which the living body is slightly displaced is included in the search range. The range slightly displaced from the reference position is referred to as a stop monitoring range.

Next, how processing is performed when the stop monitoring range is provided to the method, described according to the flow chart shown in FIG. 7, for setting up a movement direction search range in the previously described fingerprint authentication device 1 will be explained with reference to a flow chart (steps A10 to A40, A51 to A57, A60 to A100) shown in FIG. 11.

Note that the same step number as the previously described step number indicates the same or nearly the same processing and therefore detailed explanation thereof is omitted.

In this method, when the movement direction initial search range is set up, a stop monitoring count M is initialized to zero, M=0 (step A10). Further, when the movement direction search range is reduced (refer to YES route at step A30), the movement direction is searched within the reduced movement direction search range (reduced search range) (step A40) and a matching degree (maximum matching degree) MAX_Cv representing the degree of overlap of corresponding images within the movement speed estimate range is calculated and stored in the non-volatile memory unit 90, etc. (step A51).

Note that the matching degree means a matching degree to which two successive partial images out of a plurality of partial images collected by the fingerprint sensor 31 match each other. In this embodiment, for two successive partial images, there are two matching degrees, one calculated from the movement speed estimate range and the other calculated from the stop monitoring range. Comparison of the two matching degrees causes the movement distance and movement direction to be obtained.

Further, when the subpixel error is present, one or more of partial images are skipped until the movement distance reaches a predetermined number of pixels or more. For example, when the movement distance reaches in practice only 0.5 pixels, skipping one partial image allows detection of one-pixel movement. Note that the movement speed at this point is 0.5 pixels on average.

Subsequently, the movement speed estimate range is updated (step A52) and the movement speed is searched within the stop monitoring range (step A53). Further, the matching degree (maximum matching degree) MAX_Cs representing the degree of overlap of corresponding images in the stop monitoring range is calculated and stored in the volatile memory unit 90, etc. (step A54).

Then, MAX_Cv and MAX_Cs are compared (step A55) and when MAX_Cs is greater (refer to NO route at step A55), a finger is determined to be in a stop state and the stop monitoring count M is incremented (step A 56). Further, when MAX_Cv is greater (refer to YES route at step A55), a finger is determined to be in a movement state and the stop monitoring count M is set to zero (step A57).

Note that the stop monitoring count M is a counter used for determination of continuation of a stop state and when the stop state continues for a long period of time, i.e., the value of the stop monitoring count M is beyond a threshold T, termination of input of biometric information is determined, and when a finger is temporarily in the stop state, detection of the movement direction is continued.

That is, whether the stop monitoring count M is beyond the threshold T or biometric information image is not present is determined (step A100) and when the biometric information image is not present or the stop monitoring count M is beyond the threshold T (refer to YES route at step A100), termination of collection of the partial image of a fingerprint is determined and the process is terminated. Further, when the biometric information image is present or the stop monitoring count M is below the threshold T (refer to NO route at step A100), the process returns to step A20.

Figure 11:
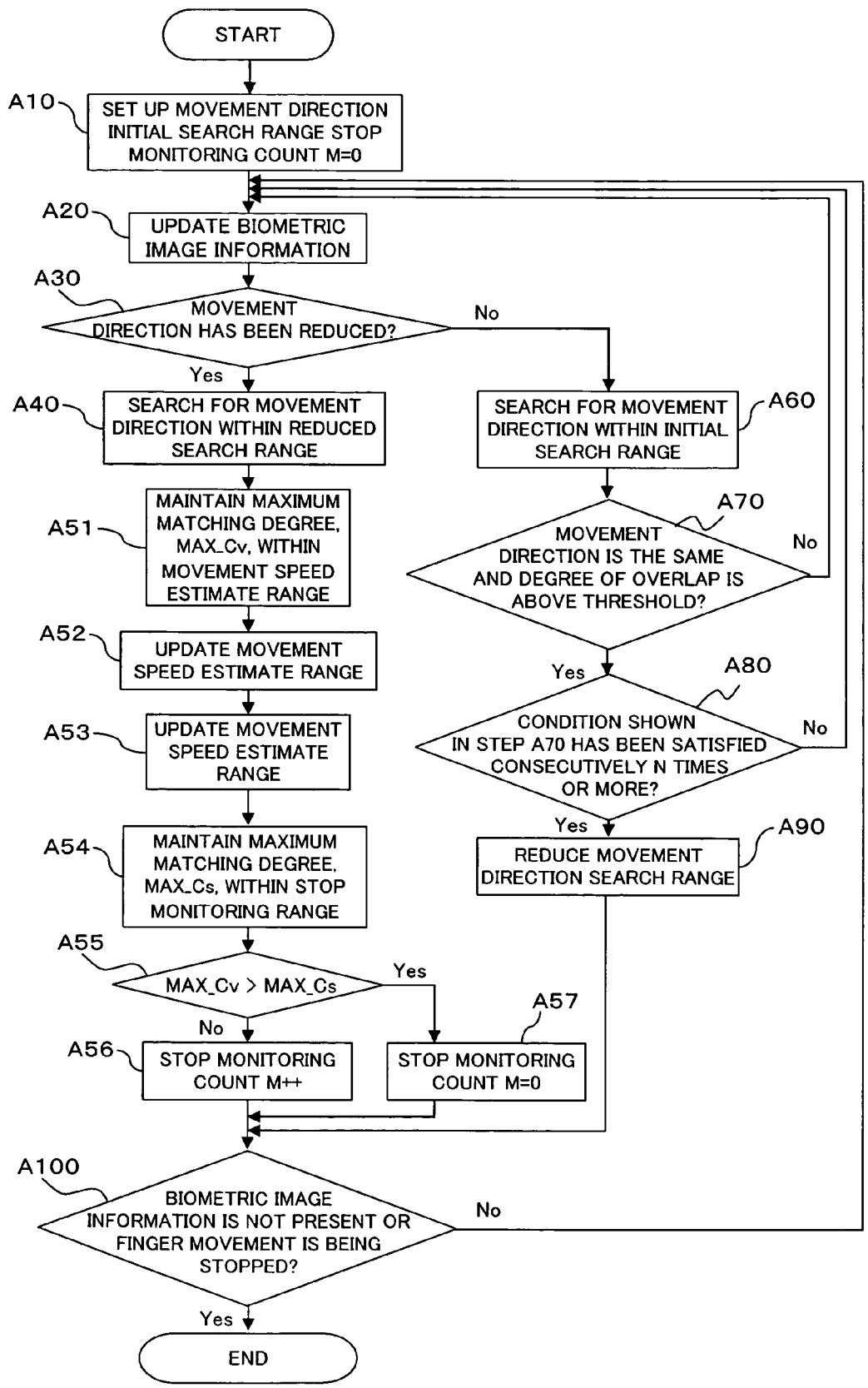
FIG. 11 is a flow chart to explain how a stop monitoring range is set up in addition to the movement direction search range in the fingerprint authentication device as one embodiment of the invention.

Note that although in the example shown in FIG. 11, the count M is used to determine the fact that the stop state has continued for a long period of time and determination is performed based on the count number in the count, the invention is not limited to the above example, but for example, may be configured so that the duration of continuation of a stop state is measured and the duration is compared to a threshold. In this manner, various modifications may be made without departing from the scope of the invention.

A coordinate conversion means 14 is for using the movement direction detected by a movement direction detection means 11 and performing a coordinate conversion on biometric information collected by the fingerprint sensor 31. Further, the coordinate conversion means 14 is operable to use information indicative of a difference between the movement direction detected by the movement direction detection means 11 and a predetermined direction related to the fingerprint sensor 31 for coordinate conversion.

Note that biometric information collected by the fingerprint sensor 31 includes not only a fingerprint image (partial image) collected by the fingerprint sensor 31 but also a variety of information derived from the fingerprint image, for example, minutiae information extracted from the fingerprint image. Accordingly, the coordinate conversion means 14 may perform a coordinate conversion on the minutiae information extracted from the fingerprint image. Note that in this embodiment, an example in which a partial fingerprint image is used as biometric information and the coordinate conversion means 14 perform a coordinate conversion on the partial image will be shown.

The coordinate conversion means 14 uses the movement direction detected by the movement direction detection means 11 for coordinate conversion of the partial fingerprint image collected by the fingerprint sensor 31. In more detail, the coordinate conversion is performed using then affine conversion as shown in the following equation (6).

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \qquad (6)$$

For example, in the sweep fingerprint sensor, a site around the first knuckle of a finger is placed on the sensor surface to obtain the entire fingerprint image and the finger is caused to slide until the finger tip is brought into contact with a biometric information collection means 10. When a user operates the sensor, he/she would be instructed to move his/her finger on the sensor as if the finger is pulled back in front of him/her. Accordingly, conversion is performed in such a way that the slide movement of the finger always points in the vertical and downward direction with respect to the biometric information image.

Figure 8:
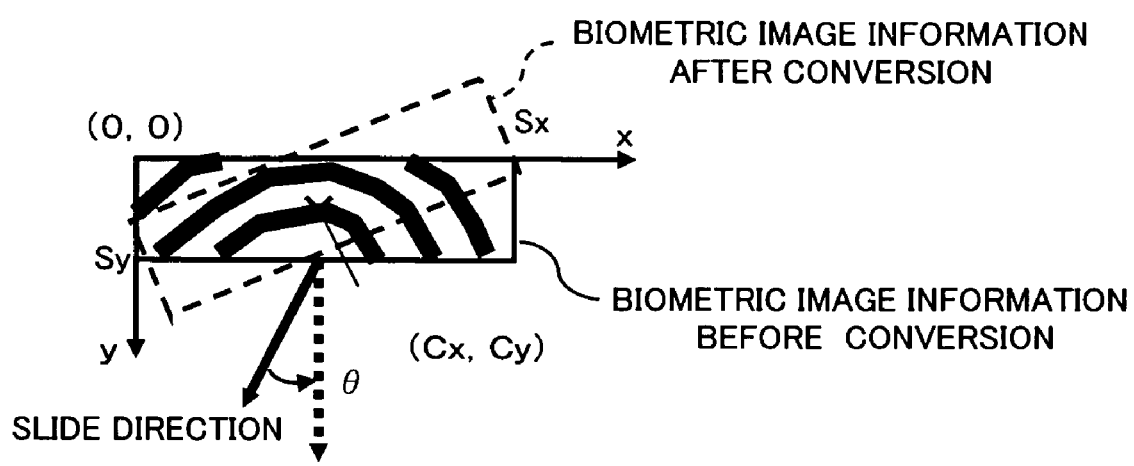
FIG. 8 is a diagram illustrating a relationship between biometric information images before and after coordinate conversion in the authentication device as one embodiment of the invention.

FIG. 8 is a diagram illustrating a relationship between biometric information images before and after coordinate conversion in the fingerprint authentication device 1 as one embodiment of the invention.

When a coordinate system used to express the biometric information image is the one shown in FIG. 8, a conversion equation (7) is given as follows.

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x - C_x \\ y - C_y \end{pmatrix} + \begin{pmatrix} C_x \\ C_y \end{pmatrix} \qquad (7)$$

In this case, θ is rotation angle, and Cx and Cy are rotation centers in x-axis and y-axis directions. For example, the rotation centers may be the image centers, Cx=Sx/2, Cy=Sy/2.

Further, when the amounts of movement of the biometric information derived from the two successive biometric information images are Δx and Δy in x-axis and y-axis directions, respectively, the rotation angle θ is represented by the following equations (8) to (11).

$$i)\ \Delta x > 0, \Delta y > 0\ \text{(first quadrant)}\ \theta = \frac{\pi}{4} - \tan^{-1}\left(\frac{\Delta_y}{\Delta_x}\right) \qquad (8)$$

$$ii)\ \Delta x < 0, \Delta y > 0\ \text{(second quadrant)}\ \theta = -\frac{\pi}{4} - \tan^{-1}\left(\frac{\Delta_y}{\Delta_x}\right) \qquad (9)$$

$$iii)\ \Delta x < 0, \Delta y < 0\ \text{(third quadrant)}\ \theta = -\frac{\pi}{4} - \tan^{-1}\left(\frac{\Delta_y}{\Delta_x}\right) \qquad (10)$$

$$iv)\ \Delta x > 0, \Delta y < 0\ \text{(fourth quadrant)}\ \theta = \frac{\pi}{4} - \tan^{-1}\left(\frac{\Delta_y}{\Delta_x}\right) \qquad (11)$$

The processing of coordinate conversion generally takes a long period of time because conversion computation is made using a rotating matrix containing trigonometric functions as described above. Therefore, to avoid complexity, coordinate conversion taking into account only the sign of Vy may be employed as simpler coordinate conversion. That is, the conversion is performed in such a way that a y-axis component of the slide direction points in a vertical and downward direction with respect to the biometric information image. In more detail, when the y-axis component of the slide direction points in a vertical and upward direction with respect to the biometric information image, the biometric information image is rotated 180 degrees and then output. When the image is simply rotated 180 degrees, conversion is completed only by copying pixel values from one memory to another, allowing saving of memory capacity and reduction in computation time.

If the duration required for processing is long, it is proposed that angle information is not used in order to avoid overhead, except that only rotation angle information is added to the partial fingerprint image.

Both FIGS. 12(a), 12(b) are diagrams illustrating the appearance of the fingerprint authentication device 1 as one embodiment of the invention and FIG. 12(a) is a diagram illustrating an example of the appearance of the fingerprint authentication device 1, and FIG. 12(b) is a diagram illustrating an example of the appearance of the fingerprint authentication device 1 after modification.

The fingerprint authentication device 1 shown in FIGS. 12(a), 12(b) includes a main body 1a provided with a fingerprint sensor 31 and a display unit 1b provided with a display 81, in which the main body and the display unit are connected together so that those two components are openablely by way of a two-axis hinge (nail clipper designed hinge) 1c.

In more detail, as denoted by an arrow "a" in FIG. 12(a), the display unit 1b can be rotated nearly 180 degrees about an axis c1 of the two-axis hinge 1c relative to the main body 1a, thereby allowing the main body 1a and display unit 1b to be folded in a hinge-like manner. Further, as denoted by an arrow "b" in FIG. 12(a), the display unit 1b can be rotated about an axis c2 of the two-axis hinge 1c, thereby allowing the display unit 1b to be rotated 180 degrees.

Moreover, the display unit 1b in a state shown in FIG. 12(a) is rotated respectively about the axes c1 and c2 of the two-axis hinge 1c relative to the main body 1a, thereby allowing the main body 1a and display unit 1b to be folded in such a manner that the display 81 is exposed to a front of the device, as shown in FIG. 12(b).

Further, both the main body 1a and display unit 1b have a rectangle shape and the main body 1a has a larger dimension than the display unit 1b, along a direction orthogonal to the side thereof used to provide connection with the display unit 1b via the two-axis hinge 1c. Additionally, the fingerprint sensor 31 is formed on an end portion of a surface of the main body 1a opposite to the two-axis hinge 1c, which surface is to overlap the display unit 1b.

This allows a subject to be authenticated to use the fingerprint sensor 31 while viewing the display 81 in the unfolded state of the main body 1a and display unit 1b, as shown in FIG. 12(a), and further to use the fingerprint sensor 31 while viewing the display 81 even in the folded state of the main body 1a and display unit 1b, as shown in FIG. 12(b).

That is, the fingerprint authentication device 1 is configured as a laptop personal computer having the fingerprint sensor 31 mounted on the main body 1a and tailored to rotate the display unit 1b by 180 degrees and then fold the same. In this case, it is assumed that the display 81 is mounted so that the orientation of the display 81 is kept unchanged in both cases as shown in FIG. 12(a) and in FIG. 12(b).

Then, as shown in FIG. 12(a), when the subject uses the fingerprint sensor 31 in the unfolded state of the main body 1a and display unit 1b (when using in an unfolded state), the subject slides his/her finger in the direction from the two-axis hinge 1c to the opposite end (front side) of the main body 1a, and as shown in FIG. 12(b), when the subject uses the fingerprint sensor 31 in the folded state of the main body 1a and display unit 1b (when using in a folded state), the subject slides his/her finger in a direction from the opposite end of the main body 1a to the two-axis hinge 1c.

Note that when the display unit 1b in a state shown in FIG. 12(a) is rotated to a state shown in FIG. 12(b), the fingerprint sensor 31 is brought into a state in which the sensor is rotated 180 degrees when viewed from the subject.

As described above, although in the fingerprint authentication device 1, the slide directions of a finger on the fingerprint sensor 31 in the unfolded state as shown in FIG. 12(a) and in the folded state as shown in FIG. 12(b) are opposite, the coordinate conversion means 14 in the fingerprint authentication device 1 performs a coordinate conversion on the partial fingerprint image depending on the slide direction.

In more detail, based on the fact that the slide direction on the fingerprint sensor 31 is being rotated 180 degrees relative to the slide direction on the fingerprint sensor 31 in the unfolded state, the coordinate conversion means 14 performs a coordinate conversion as described above so that the partial fingerprint image collected by the fingerprint sensor 31 is rotated 180 degrees.

Accordingly, as shown in FIG. 12(b), an upright fingerprint image (partial image) is displayed on the display 81 even in the folded state, preventing the biometric information image from being reversed in the up/down or left/right direction and the subject from feeling odd.

That is, when the fingerprint image is input, a user will simply slide his/her finger on the fingerprint sensor 31 so that the finger is always pulled towards a front of him/her.

FIGS. 13(a), 13(b) are diagrams to explain instruction directions displayed on the display 81 of the fingerprint authentication device 1 as one embodiment of the invention.

A position detection means 16 is for detecting a position of the finger of the subject relative to the fingerprint sensor 31 and an instruction means 17 is for instructing and prompting the subject to move his/her finger, based on the subject's finger position detected by the fingerprint sensor 31, so that the subject's finger is disposed in a position in which the finger is to be placed on the fingerprint sensor 31. For example, an instruction for the subject to promptly move his/her finger is displayed on the display 81, along with a direction in which the finger is to be moved.

For example, as shown in FIGS. 13(a), 13(b), in the fingerprint authentication device 1 having the fingerprint sensor 31 mounted on the main body 1a and being capable of folding the display unit 1b in a state in which the unit is being reversed by the two-axis hinge 1c, it is assumed that the display 81 is mounted so that the orientation of the display 81 is kept unchanged when viewed from the subject, regardless of whether the device is used in the unfolded state of the main body 1a and display unit 1b as shown in FIG. 13(a) or in the folded state of the main body 1a and display unit 1b as shown in FIG. 13(b).

As described above, although when the fingerprint authentication device 1 reads a fingerprint, the slide directions of a finger on the fingerprint sensor 31 in the unfolded state (shown in FIG. 13(a)) and in the folded state (shown in FIG. 13(b)) are opposite, the subject may simply slide his/her finger on the fingerprint sensor 31 so that the finger is always pulled toward a front of him/her when inputting the fingerprint image. In this case, when the slide direction and the vertical/downward direction on the display 81 match, the subject may be properly instructed.

That is, based on the slide direction detected by the movement direction detection means 11, the coordinate conversion means 14 performs a coordinate conversion so that the partial fingerprint image collected by the fingerprint sensor 31 is reversed in the up/down or left/right direction. Or, the instruction means 17 instructs the subject to slide his/her finger in the reversed up/down or left/right direction, based on the detected slide direction. Note that in the example shown in FIGS. 13(a), 13(b), a direction in which the subject should slide his/her finger is displayed as an arrow on the display 81 for the purpose of warning to the subject.

Next, the position detection means 16 will be explained in detail. The position detection means 16 is operable to detect an area containing biometric information from the image acquired by the fingerprint sensor 31. For example, when a living body to be subjected to this treatment is a fingerprint, the biometric information image expressed by a ridge having a larger pixel value than a valley is assumed. Further, when the living body is hand vascular, palm vein or finger vein, the biometric information image expressed by a vein having a larger pixel value than a blood vessel other than a vein is assumed. Further, when the above relationship is opposite, brightness inversion techniques are applied to the image and then the same discussion holds true for the image.

In order to determine the position of a living body directly from the biometric information image, it is useful to determine a gravity center from pixel values of the biometric information image. Further, in order to determine the position more accurately, it is conceived that an area containing the biometric information image is extracted and then the gravity center is determined.

Note that hereinafter, the area containing the biometric information is referred to as a biometric information area. To extraction of the biometric information area, a general binary method or clustering method can be applied. There is a simplest method in which a predetermined threshold is defined as a certain pixel value and pixels having a value greater than the threshold are extracted as biometric information. Use of the gravity center and variance of the extracted pixels allows detection of the position of the biometric information area.

Next, the instruction means 17 will be explained. The instruction means 17 performs instructions using difference information Dx, Dy indicative of differences between positions Bx, By detected by the position detection means 16 and the corresponding central positions Cx, Cy of the fingerprint sensor 31. In more detail, if Dx=Bx−Cx, Dy=By−Cy and instruction directions are Ix, Iy, the resulting instruction directions are determined as Ix=−Dx, Iy=−Dy, as inversions of the difference information Dx, Dy.

For example, when the finger of the subject is positioned to the right relative to the fingerprint sensor 31, the instruction means 17 instructs the subject to move the living body (finger) to the left. In this case, the instruction is done, for example, by displaying a mark indicating a direction as a left-pointing arrow, etc., on the display 81. Further, in this case, directional instruction may be not displayed in a detailed fashion, but only one chosen out of constituent instruction directions and having a greater magnitude than the others is displayed, for example, using a step size of 90 degrees.

In this case, when a rotational displacement is present between the fingerprint sensor 31 and display 81, instruction on the display 81 (instruction means 17) becomes meaningless and therefore the displacement is corrected using difference information θ indicative of a difference between the movement direction detected by the fingerprint sensor 31 from the biometric information and a predetermined direction. If corrected directions are Ix', Iy', Ix', Iy' are represented by the following equation (12).

$$\begin{pmatrix} I'_x \\ I'_y \end{pmatrix} = \begin{pmatrix} \cos\theta & -\sin\theta \\ \sin\theta & \cos\theta \end{pmatrix} \begin{pmatrix} I_x \\ I_y \end{pmatrix} \qquad (12)$$

A feature extraction means 32 is for extracting the features of each partial image and the positions of the features from each of a plurality of partial images collected by the fingerprint sensor 31. In this case, as the features, both the foreground of each partial image (value of brightness of a ridge image in the embodiment) and the edges of the foreground (value of brightness gradient in the embodiment) may be extracted or ridge end and bifurcation may be extracted from a pattern created by changing the foreground (e.g., ridge image) of each partial image to thin lines.

A relative position detection means 33 is for detecting a relative position of two partial images based on the features (extracted by the feature extraction means 32) present in the area where two successive partial images out of a plurality of partial images collected by the fingerprint sensor 31 overlap with each other. In this case, the relative position detection means 33 may detect the above relative position with reference to one or more relative positions detected until the current detection is initiated, or may detect the above relative position with reference to a relative position that has been estimated based on one or more relative positions detected until the current detection is initiated and is to be subsequently detected.

Further, the relative position detection means 33 may be configured to group individual partial images successively collected by the fingerprint sensor 31 into two or more partial areas sharing a common area where these partial areas overlap with one another and then process these partial areas, and detect the above relative position for each of the two or more partial areas.

A correction means 34 is for correcting image distortion due to detection delay in the fingerprint sensor 31 or distortion due to deformation of finger. The correction means 34 has the following two types of correction functions. According to the first correction function, the amount of feature distortion (amount of distortion due to finger deformation) is calculated based on the relative position detected by the relative position detection means 33 and the position of features of each partial image, and the position of features of each partial image is corrected based on the calculated amount of distortion. Moreover, according to the second correction function, the position of features of each partial image is corrected so as to eliminate the distortion (expanding/contracting distortion and/or skew distortion) of each partial image due to delay in collection by the fingerprint sensor 31 based on a time interval for collection of each partial image by the fingerprint sensor 31, delay caused when the fingerprint sensor 31 collects each partial image, and the relative position detected by the relative position detection means 33, in order to acquire the relative position of features.

Note that when the relative position detection means 33 is configured to group individual partial images successively collected by the fingerprint sensor 31 into two or more partial areas sharing a common area where these partial areas overlap with one another and then process these partial areas, and detect the above relative position for each of the two or more partial areas, the correction means 34 corrects the position of features so that the distortion of each partial image due to delay in collection by the fingerprint sensor 31 is eliminated.

Further, the correction means 34 needs to be provided when distortion occurs in an image collected by the fingerprint sensor 31 and the correction means 34 is not necessarily provided when the fingerprint sensor 31 is able to ignore the distortion of the image.

A moving object detection means 35 is for detecting presence/absence of a movement object (in this case, subject's finger) moving relative to the fingerprint sensor 31 based on a plurality of partial images collected by the fingerprint sensor 31 and for example, is operable to calculate the weighted mean image of partial images that have been collected by the fingerprint sensor 31 until the current collection is initiated and detect presence/absence of the movement object based on the calculated weighted mean image. In more detail, the moving object detection means 35 is operable to detect the existence of the movement object when the value of a difference between latest partial image collected by the fingerprint sensor 31 and the calculated weighted mean image exceeds a predetermined threshold, and the predetermined threshold is set to a value greater than the value of variation due to noise.

An enrollment/matching data generating unit (generating means) 36 is for using the features extracted by the feature extraction means 32 and the relative position of features acquired by the correction means 34 and then generating fingerprint data (enrollment data and matching data) used to identify, for authentication, a subject as the person himself/herself. When enrollment of fingerprint data is performed, the fingerprint data (known information such as positions and pattern of ridge bifurcation and end) generated by the enrollment/matching data generating unit 36 is enrolled and then stored as enrollment data in a non-volatile memory unit 91. When a subject is going to be identified as the person himself/herself, the fingerprint data (information about ridge bifurcation and end) generated by the enrollment/matching data generating unit 36 is sent as matching data to a matching unit 37.

The matching unit (matching means) 37 is for comparing the matching data generated by the enrollment/matching data generating unit 36 and the subject's enrollment data stored in the non-volatile memory unit 91 in order to perform matching and then identify, for authentication, a subject as the person himself/herself. The matching unit 37 is configured so that the features and relative position obtained from partial images visualized at earlier time points (time points recorded as a time stamp value by a real time clock 80) by the fingerprint sensor 31 are preferentially used to perform the above matching which is completed upon confirmation of matching results for the subject.

The matching unit 35 comprises a matching degree calculation means 19 and matching degree determination means 20. The matching degree calculation means 19 is for calculating the degree of matching between the matching data generated by the enrollment/matching data generating unit 36 and the subject's enrollment data stored in the non-volatile memory unit 91. Note that for example, a correlation coefficient in a cross-correlation method is used as the degree of matching.

Further, the matching degree determination means 20 is operable to determine, based on the degree of matching calculated by the matching degree calculation means 19, that the matching data generated by the enrollment/matching data generating unit 36 and the subject's enrollment data stored in the non-volatile memory unit 91 match, for example, when the degree of matching is greater than a previously defined threshold, in order to identify, for authentication, the subject as an enrollment himself/herself who enrolled the corresponding enrollment data.

Figure 14:
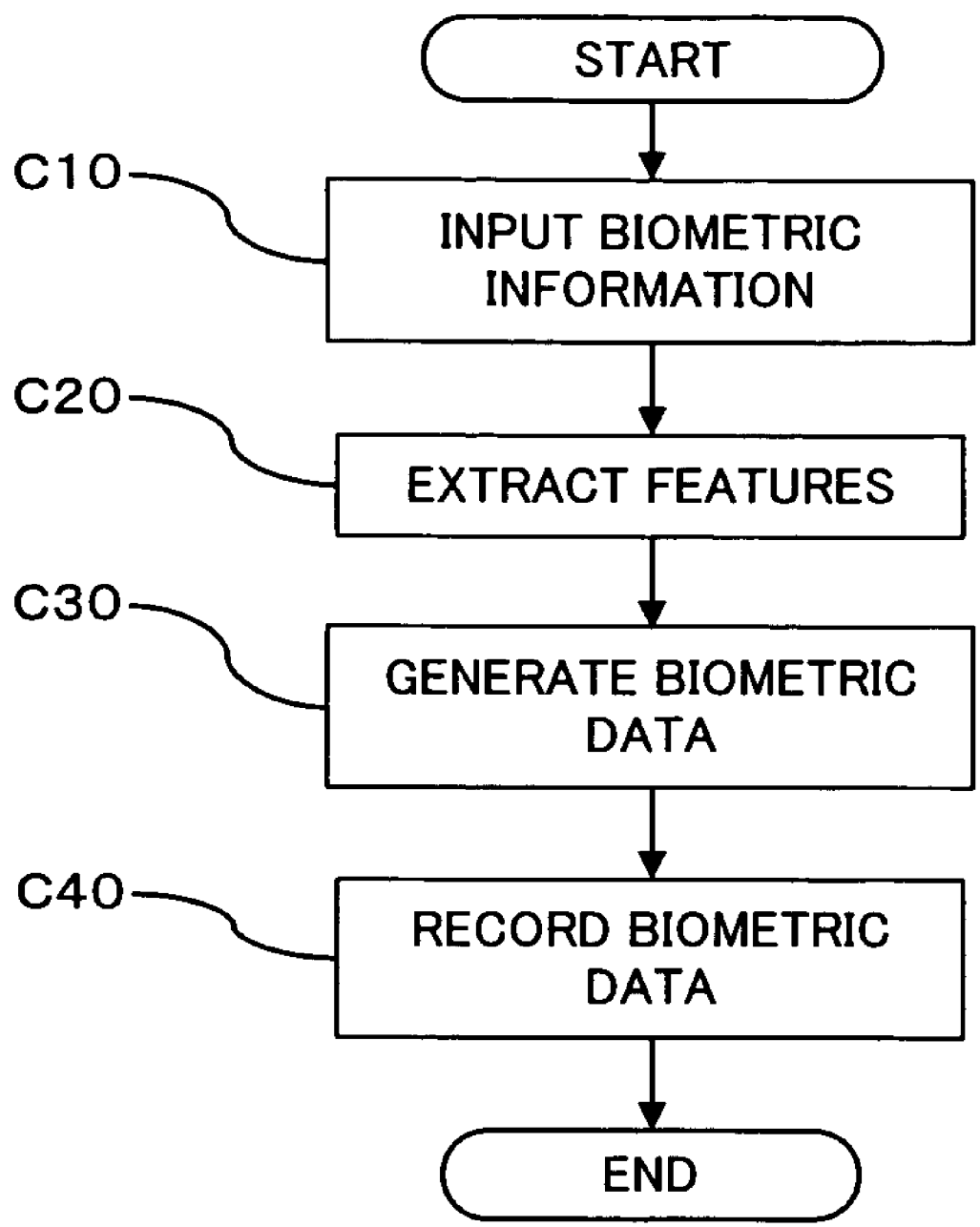
FIG. 14 is a flow chart to explain how processing is performed in the authentication device as one embodiment of the invention.

How processing is performed in the fingerprint authentication device 1 configured as above and as one embodiment of the invention will be explained with reference to flow charts shown in FIGS. 14 to 16. FIG. 14 is a flow chart (steps C10 to C40) for explanation of how the enrollment data is enrolled in the fingerprint authentication device 1 as one embodiment of the invention, FIG. 15 is a flow chart (steps D10 to D60) for explanation of how the matching is performed, and FIG. 16 is a flow chart (steps E10-E30) for explanation of how steps of inputting biometric information are performed in FIGS. 14 and 15.

When enrollment processing is performed, a subject uses the biometric information collection means 10 (fingerprint sensor 31) to perform input of biometric information (fingerprint) (step C10). A feature extraction unit 32 performs extraction of characteristics based on biometric information input through the fingerprint sensor 31 (step C20) and the enrollment/matching data generating unit 36 generates biometric data (step C30), and the generated biometric data is recorded in the non-volatile memory 91 (storage means 22) (step C40).

Further, when the matching is performed, input of biometric information (fingerprint) is done using the biometric information collection means 10 (fingerprint sensor 31) (step D10). The feature extraction unit 32 performs extraction of features based on the biometric information input through the fingerprint sensor 31 (step D20) in order to generate biometric data (step D30). Then, the matching degree calculation means 19 retrieves the biometric data stored in the non-volatile memory 91 (storage means 22) (step D40) in order to perform calculation of the degree of matching (step D50) and the matching degree determination means 20 performs determination based on the calculated degree of matching (step D60).

Figure 15:
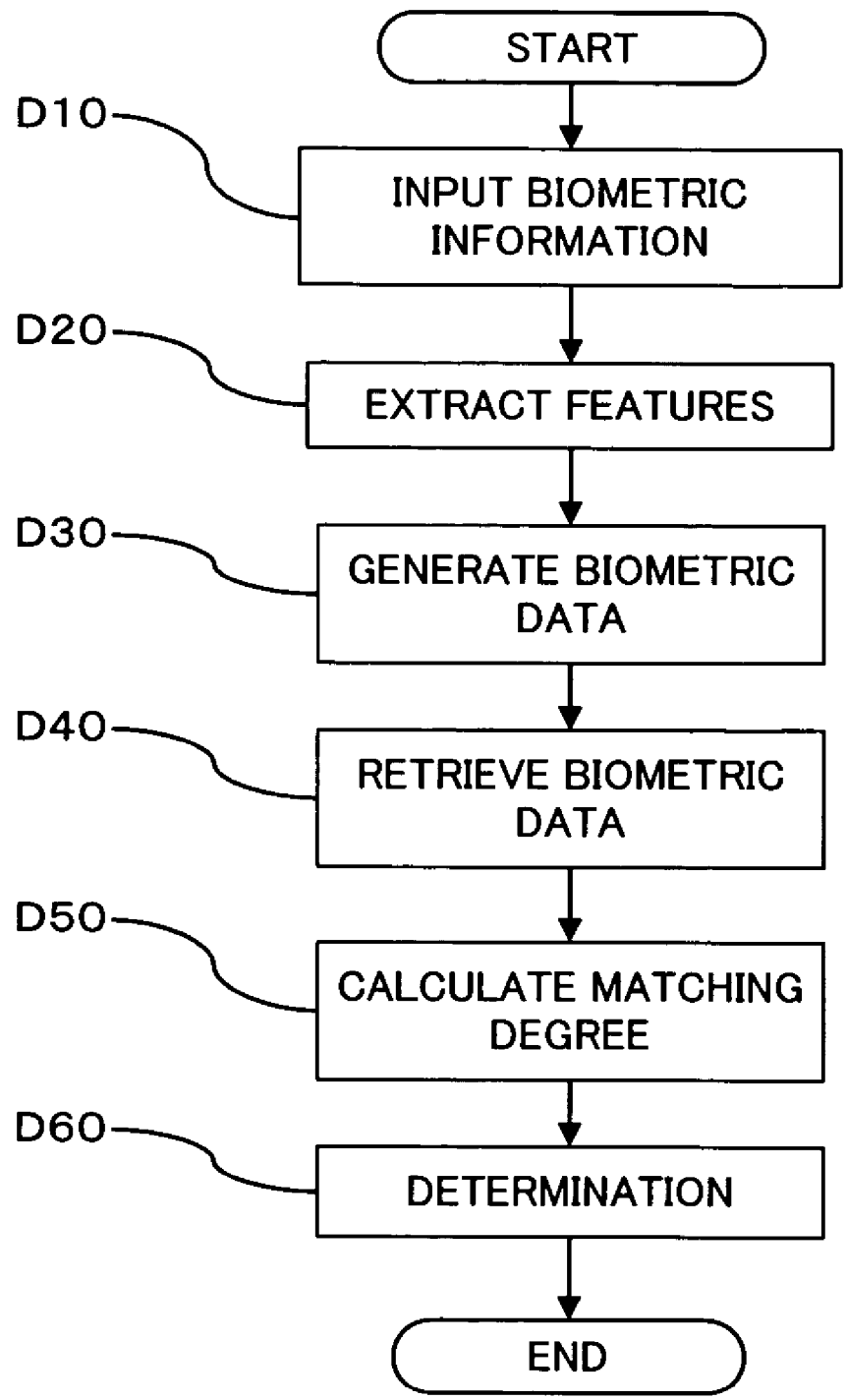
FIG. 15 is a flow chart to explain how processing is performed in the authentication device as one embodiment of the invention.
Figure 16:
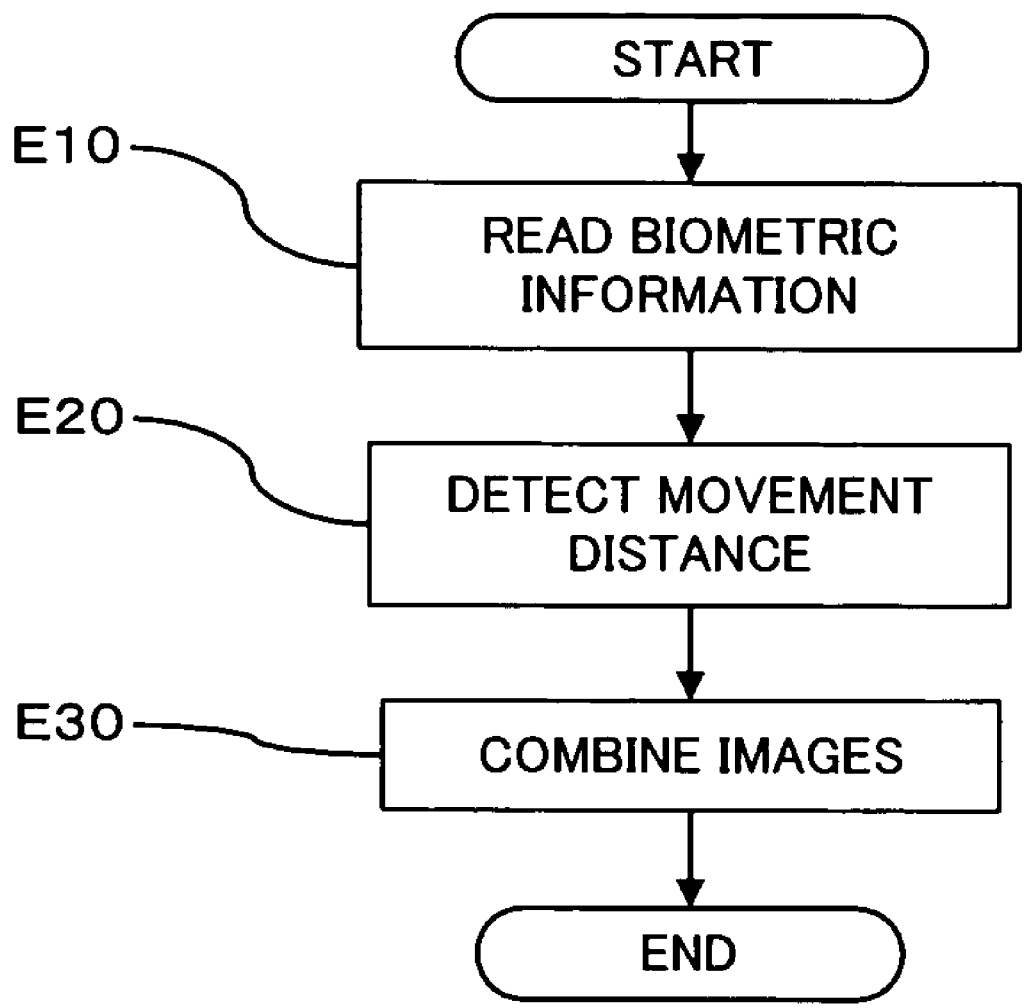
FIG. 16 is a flow chart to explain how a biometric information input step is performed in FIG. 14 and FIG. 15.

Additionally, the above-described input of biometric information in step C10 of FIG. 14 and step D10 of FIG. 15 is done in accordance with the flow chart shown in FIG. 16. That is, after the partial image of a living body site has been read by the biometric information collection means 10 (step E10) detection of movement distance is performed based on the collected biometric information (step E20), after which partial images are combined (step E30).

Note that in the flow chart shown in FIG. 16, illustration of loop concept is omitted. For example, a movement distance detection step denoted as step E20 may be initiated after a biometric information reading step, denoted as step E10, has been repeatedly performed on a plurality of partial images, or an image combining step denoted as step E30 may be initiated after the biometric information reading step denoted as step E10 and movement distance detection step denoted as step E20 have been repeatedly performed, or alternatively, the biometric information reading step denoted as step E10, movement distance detection step denoted as step E20 and image combining step denoted as step E30 may be repeatedly performed, meaning that various modifications may be made without departing the scope of the invention.

Further, determination of such loop termination can be performed using combination of optional elements such as elapsed time, the number of readings, movement distance, movement stop, available buffer capacity, and the fact that an image has no contents. Note that the determination of loop termination using the movement distance out of these elements can be performed after detection of movement distance.

Moreover, the processing previously described with reference to the flow charts shown in FIGS. 7, 11 corresponds to the biometric information input steps denoted as step C10 of FIG. 14 and step D10 of FIG. 15, and further to the biometric information reading step denoted as step E10 and movement distance detection step denoted as step E20 of FIG. 16.

As described above, according to the fingerprint authentication device 1 as one embodiment of the invention, since the coordinate conversion means 14 performs a coordinate conversion on the collected biometric information based on the movement direction from the biometric information detected by the movement direction detection means 11, even when an angular difference (rotational displacement) between the most preferable slide direction on the fingerprint sensor 31 (e.g., normal line direction passing through the center of the fingerprint sensor 31) and the slide direction of subject 's finger occurs during collection of partial images of a fingerprint, the rotational displacement can be corrected, allowing an upright image to be reliably obtained. This allows an upright image to be reliably obtained even when the slide direction changes each time a finger slides and rotational displacement is present in each of individual partial images of a fingerprint. That is, it becomes possible for the device to be insensitive to influence of the rotational displacement present in the fingerprint image, which displacement changes depending on the slide direction.

Further, a fingerprint image can be obtained as an upright image even if the partial image of a fingerprint is collected when the orientation of the fingerprint sensor 31 is changed, e.g., the fingerprint authentication device 1 is rotated to an upside down position and then used, and the fingerprint image can be collected irrespective of the orientation of the fingerprint authentication device 1 (fingerprint sensor 31), thereby allowing the device to be highly convenient.

Additionally, the fingerprint image can be obtained as an upright image regardless of the pointing direction (orientation) of the fingerprint authentication device 1, display 81, and fingerprint sensor 31 etc., and therefore there is no need for detecting and determining the pointing direction (orientation) of the fingerprint authentication device 1, display 81, and fingerprint sensor 31, etc., thereby eliminating the need for inclusion of functions (hardware, software) to detect and determine such a pointing direction and reducing manufacturing cost.

Moreover, even when the collected fingerprint image is displayed on the display 81, the device is able to display the biometric information image so that the image is never affected by rotation of the device, thereby easily providing visual confirmation that the fingerprint image has been properly obtained.

Further, it becomes possible that the degree of freedom of direction of the sensor (fingerprint sensor, etc.) providing the biometric information collection means 10 are higher during mounting of the sensor and reduction in the mounting area of a wiring pattern reduces the volume and price of the device.

Figure 17:
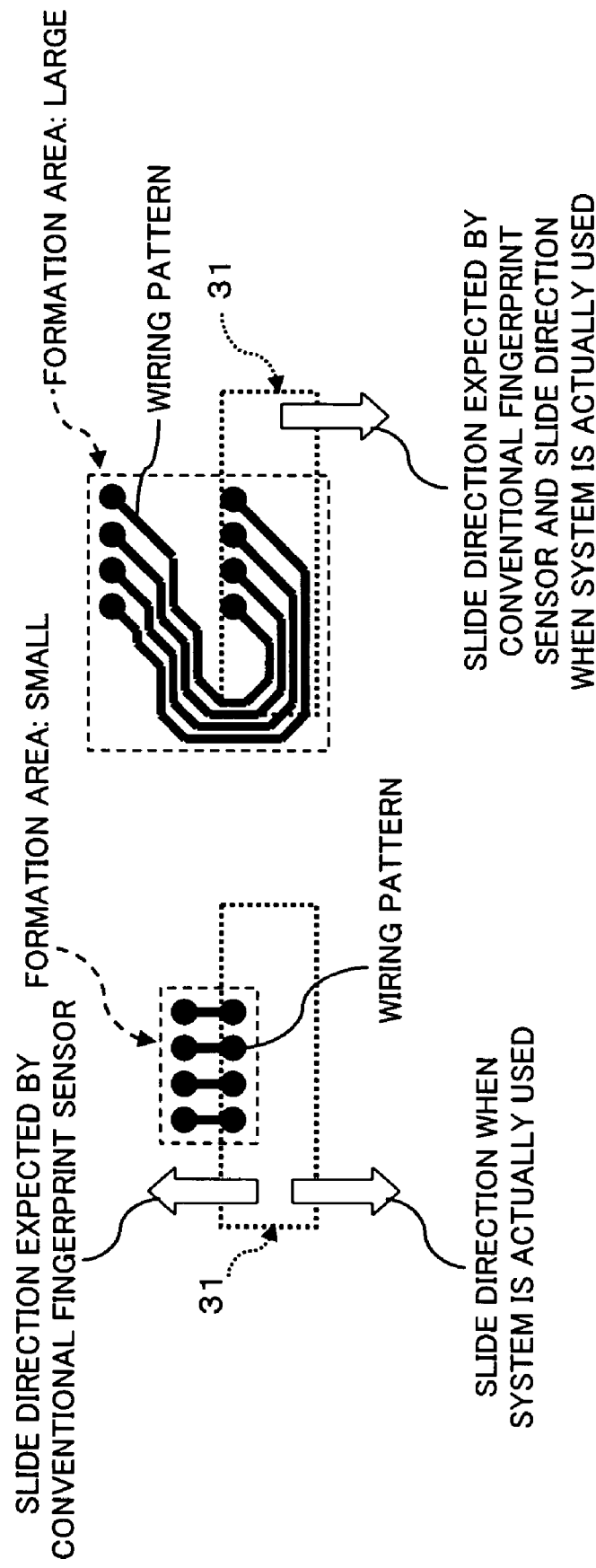
FIGS. 17(a), 17(b) are diagrams to explain a relationship between a wiring pattern and mounting area in the fingerprint sensor.

FIGS. 17(*a*), 17(*b*) are diagrams to explain a relationship between a wiring pattern and the mounting area of the pattern on the fingerprint sensor 31, FIG. 17(*a*) is a diagram illustrating the mounting area in the case of the wiring pattern length being short, and FIG. 17(*b*) is a diagram illustrating the mounting area in the case of the wiring pattern length being long. As can be seen from FIGS. 17(*a*), 17(*b*), if the degree of freedom of mounting the sensor can be made high and the sensor can be mounted on short wiring setting when mounting of the fingerprint sensor 31 is performed, the mounting area can be reduced.

Further, when the biometric information collection means 10 is a device of the type allowing biometric information to be read by the biometric information collection means 10 being brought into contact with a living body and further when the living body is moving relative to the sensor and a living body site contacting the sensor is rarely moved because of bending of outer skin of the living body due to friction etc., in other words, pulling force occurs between the sensor and living body, a movement direction of the living body can be properly detected, allowing reliable collection of biometric information.

For example, in a case where a subject to be authenticated is unfamiliar to an operation of sliding his/her finger on the sensor, it would probably be expected that the degree of a force to be applied to move (slide) the finger becomes unsuitable and the living body site contacting the fingerprint sensor 31 is hardly moved because of bending of outer skin of the living body due to friction, etc., in other words, pulling force occurs between the sensor and living body. As such, even when the slide movement instantly and temporarily stops, the device continuously allows accurate detection of movement direction and enables even the subject unfamiliar to the sliding operation to easily perform input of biometric information.

Additionally, even when a rotational displacement between the most preferable slide direction on the fingerprint sensor 31 and the movement direction of the finger occurs during collection of biometric information, the device allows a display means 15 to display biometric information (upright image) after correction of the rotational displacement of information. In more detail, for example, even when the degree of freedom of the using direction of the biometric information collection means 10 is high, i.e., when the biometric information collection means 10 is used in an upside down position, the device allows the display means 15 to display an upright image and further allows the high degree of freedom of the mounting direction of the sensor providing the biometric information collection means 10.

Moreover, even when the position of a living body site relative to the biometric information collection means is detected and the subject is prompted to move the living body site so that the living body site is located in place, the device is able to easily perform instruction, providing great convenience. Additionally, even when the degree of freedom of the using direction of the biometric information collection means 10 is high, i.e., when the means 10 is used in an upside down position, the device is able to properly instruct the subject to correct positional displacement and further allows the high degree of freedom of the mounting direction of the sensor providing the biometric information collection means 10.

Additionally, performing authentication using biometric information after correction of rotational displacement of the information allows authentication process to be performed without influence of rotational displacement during collection of biometric information. For example, even when the orientation of the fingerprint authentication device during enrollment of enrollment data and the orientation of the fingerprint authentication device during matching are significantly different, the device is able to perform authentication without lowering its authentication ability, thereby providing great convenience.

(B) Explanation of First Modification

Figure 18:
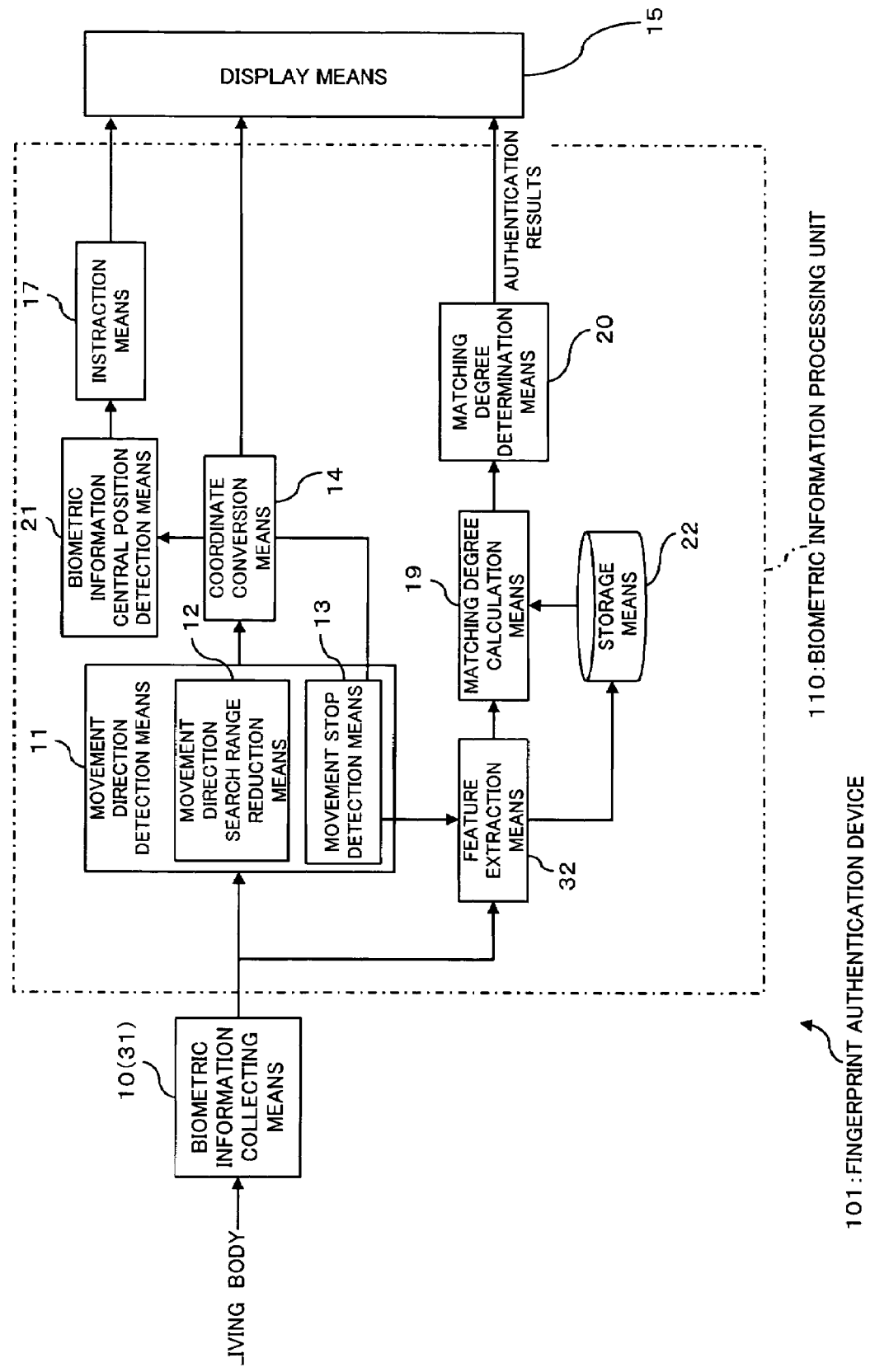
FIG. 18 is a block diagram illustrating a functional configuration of a first modification of the fingerprint authentication device as one embodiment of the invention.

FIG. 18 is a block diagram illustrating the functional configuration of a first modification of the fingerprint authentication device as one embodiment of the invention.

A fingerprint authentication device 101 is configured in nearly the same way as in the first embodiment, except that a biometric information central position detection means 21 is provided instead of the position detection means 16 in the fingerprint authentication device 1 of the first embodiment. Note that in FIG. 18, the same numerals previously used designate the same or nearly the same elements and therefore detailed explanation thereof is omitted.

The biometric information central position detection means 21 is for detecting a central position of a partial fingerprint image (biometric information) collected by the fingerprint sensor 31 (biometric information collection means 10). Note that as a method for detecting the central position of partial image through the use of the biometric information central position detection means 21, a variety of methods previously described can be employed and for example, when the biometric information is a fingerprint, the technology disclosed in Japanese Patent Laid-Open No. 2002-109543) can be employed.

The instruction means 17 of the first modification is for correcting difference information indicative of a difference between a biometric information central position detected by the biometric information central position detection means 21 and a predetermined position on the fingerprint sensor 31, using difference information indicative of a difference between a movement direction detected by the movement direction detection means 11 and a predetermined direction, and instructing and prompting the subject to move his/her finger so that the subject's finger is located in place on the fingerprint sensor 31.

In more detail, the instruction means 17 performs instruction using difference information Dx, Dy indicative of differences between biometric information central positions Bx, By detected by the biometric information central position detection means 21 and the corresponding central positions Cx, Cy on the fingerprint sensor 31. That is, if Dx=Bx−Cx, Dy=By−Cy and instruction directions are Ix, Iy, the resulting instruction directions are determined as Ix=−Dx, Iy=−Dy, resulting from inversion of the difference information Dx, Dy. In more detail, when the finger of the subject is positioned to the right relative to the fingerprint sensor 31, the instruction means 17 instructs (guides) the subject to move his/her finger to the left.

Moreover, the instruction to the subject may be done, for example, by displaying a mark indicating a direction as a left-pointing arrow, etc., on the display 81. Further, in this case, directional instruction is not displayed in a detailed fashion, but only one chosen out of constituent instruction directions and having a greater magnitude than the others is displayed, for example, using a step size of 90 degrees.

Also in this case, when a rotational displacement is present between the fingerprint sensor 31 and instruction means 17, instruction on the display becomes meaningless and therefore the displacement is corrected using difference information θ indicative of a difference between the movement direction detected by the fingerprint sensor 31 from the biometric information and a predetermined direction.

If corrected directions are Ix', Iy', they are calculated using the following equation (13).

$$\begin{pmatrix} I'_x \\ I'_y \end{pmatrix} = \begin{pmatrix} \cos\theta & -\sin\theta \\ \sin\theta & \cos\theta \end{pmatrix} \begin{pmatrix} I_x \\ I_y \end{pmatrix} \quad (13)$$

As described above, according to the fingerprint authentication device 101 as the first modification of the invention, action and effect similar to those of the first embodiment are obtained and in addition, an effect that authentication can be performed without influence of the rotational displacement is obtained by allowing the device to perform authentication using biometric information in which a rotational displacement has been corrected. Further, even when the degree of freedom of the using direction of the fingerprint sensor 31 is high, i.e., when the sensor is used in an upside down position, the device is able to properly instruct a user to correct a positional displacement and in addition, the degree of freedom of the mounting direction of the fingerprint sensor 31 becomes high, allowing the device to be extremely practical for use.

(C) Explanation of Second Modification

For an information processing device provided with the above-described fingerprint sensor 31 and display 81, it could be proposed to move a cursor (pointer) displayed on the display 81 using the fingerprint sensor 31. That is, the fingerprint sensor 31 is allowed to function as a pointing device.

Figure 19:
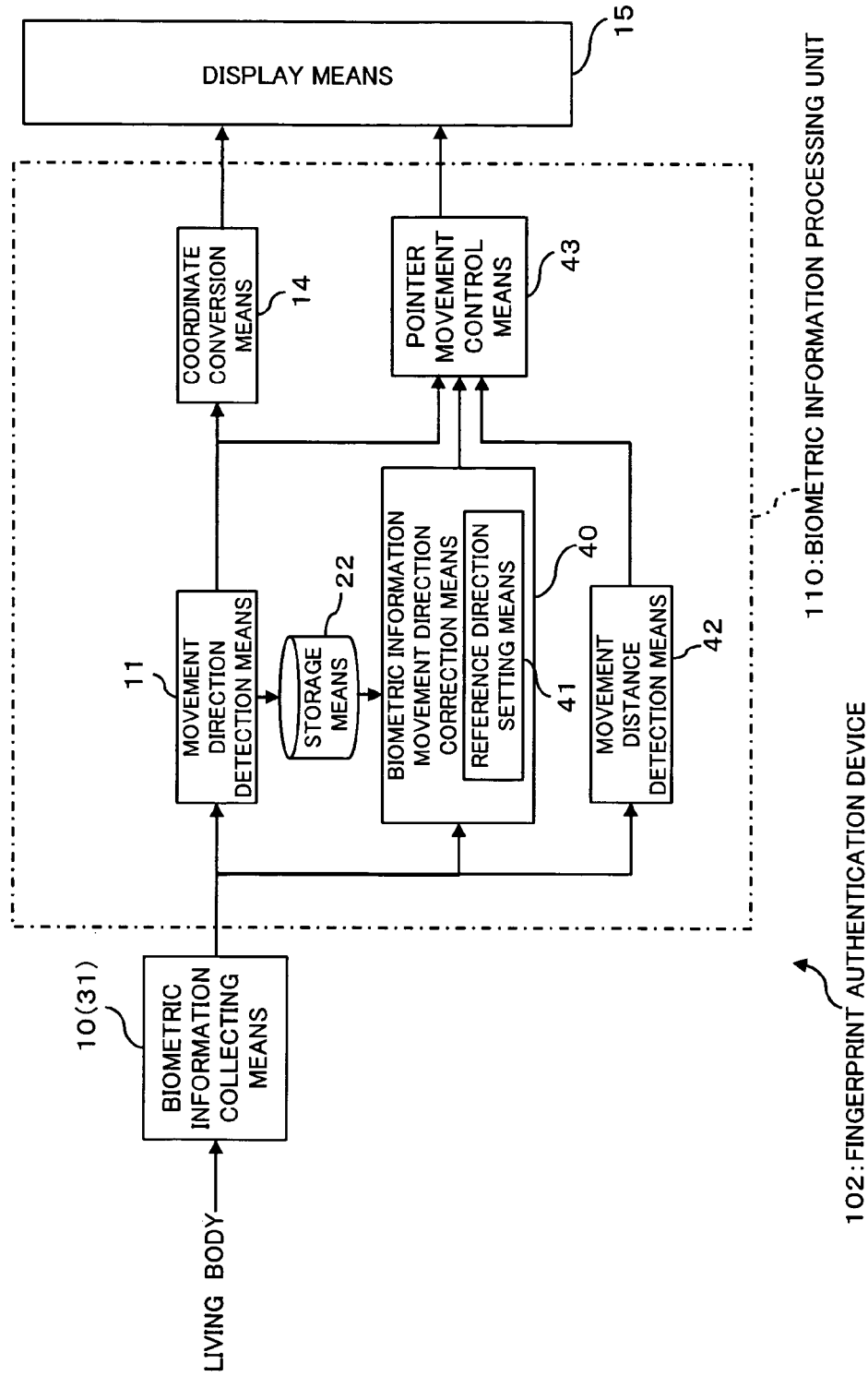
FIG. 19 is a block diagram illustrating a functional configuration of a second modification of the fingerprint authentication device as one embodiment of the invention.

FIG. 19 is a block diagram illustrating the functional configuration of a second modification of the fingerprint authentication device as one embodiment of the invention. As shown in FIG. 19, a fingerprint authentication device 102 of the second modification includes the biometric information collection means 10, the movement direction detection means 11, the coordinate conversion means 14, the display means 15, the storage means 22, the biometric information movement direction correction means 40 (reference direction setting means 41), a movement distance detection means 42, and a pointer movement control means 43. Note that in FIG. 19, the same numerals previously used designate the same or nearly the same elements and therefore detailed explanation thereof is omitted.

The movement distance detection means 42 is for detecting the movement distance of subject's (user's) finger with respect to the fingerprint sensor 31, i.e., detecting a movement distance of biometric information. The reference direction setting means 41 is for setting up the reference direction to which the movement direction of user's finger on the fingerprint sensor 31 refers and the pointer movement control means 43 is for controlling the movement of a pointer on the display means 15 based on the reference direction set up by the reference direction setting means 41, the movement direction of a finger detected by the movement direction detection means 11, and the movement distance of a finger detected by the movement distance detection means 42.

The biometric information movement direction correction means 40 includes the reference direction setting means 41 and is for detecting and correcting the movement direction of a finger with reference to the reference direction set up by the reference direction setting means 41.

Displayed on the display means 15 is a cursor that moves in response to a finger moving distance and the direction on the fingerprint sensor 31.

Figure 20:
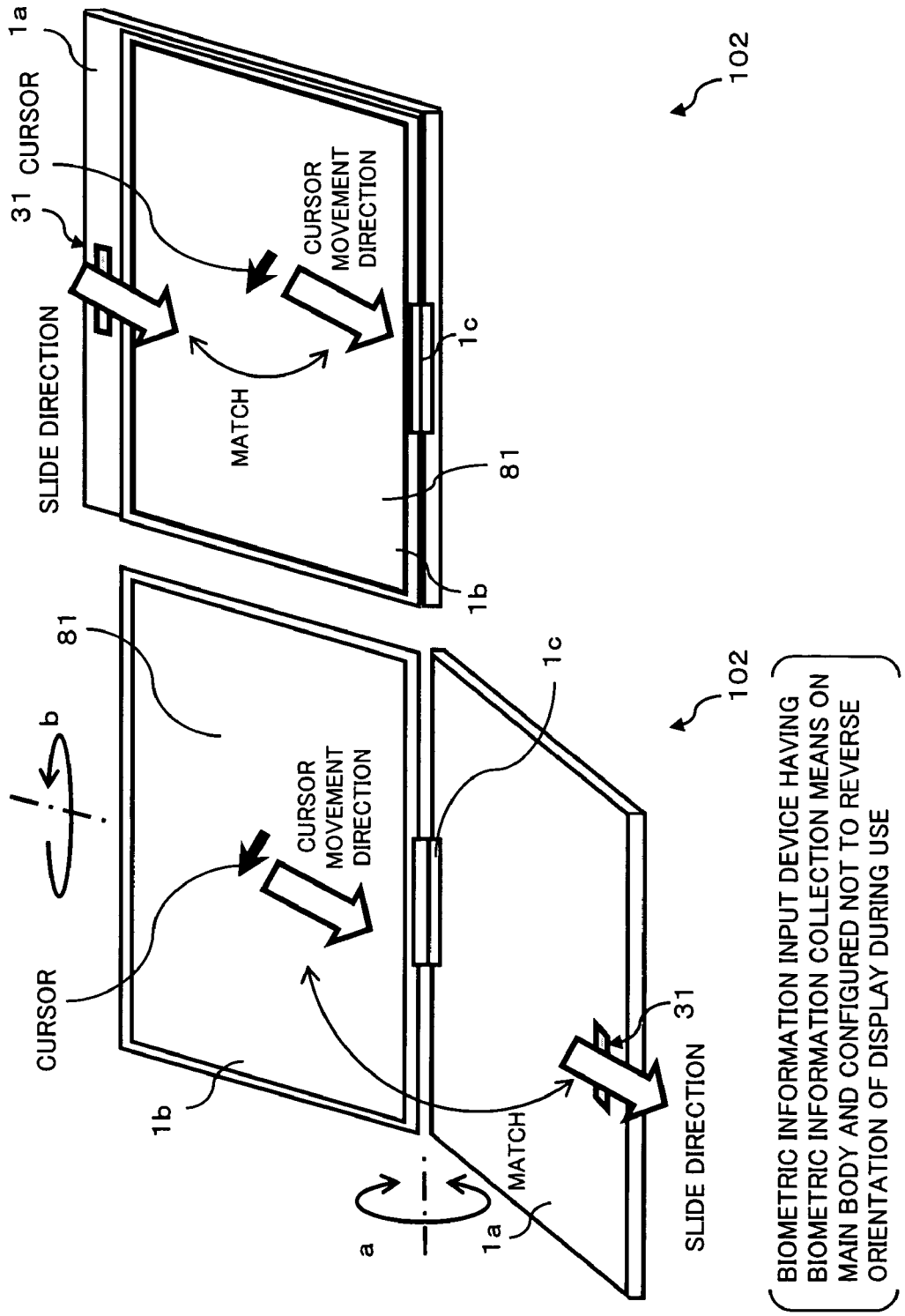
FIGS. 20(a), 20(b) both are diagrams illustrating an example of appearance of the second modification of the fingerprint authentication device as one embodiment of the invention.

Both FIGS. 20(a), 20(b) are diagrams illustrating examples of appearance of the second modification of the fingerprint authentication device 1 as one embodiment of the invention, FIG. 20(a) is a diagram illustrating an example of appearance of the fingerprint authentication device 102 before modification, and FIG. 20(b) is a diagram illustrating an example of appearance of the fingerprint authentication device 1 after modification.

Similarly to the fingerprint authentication device 1 of the first embodiment, the fingerprint authentication device 102 shown in FIGS. 20(a), 20(b) also includes the main body 1a provided with the fingerprint sensor 31 and the display unit 1b provided with the display 81, in which the main body and the display unit are openably connected together through the two-axis hinge (nail clipper hinge) 1c.

That is, the fingerprint authentication device 102 is configured as a laptop personal computer having the fingerprint sensor 31 mounted on the main body 1a and tailored to rotate the display unit 1b by 180 degrees and then fold the same. In this case, it is assumed that the display 81 is mounted so that the direction of the display 81 is kept unchanged, regardless of whether the device is used as shown in FIG. 20(a) or as shown in FIG. 20(b).

Since in the fingerprint authentication device 102, the subject (user) slides, during fingerprint authentication, his/her finger on the fingerprint sensor 31 so that the finger is pulled back in front of him/her, when the slide direction matches the vertical/downward direction relative to the display 81, the subject will be able to correct the movement direction of a finger.

Therefore, the device may be configured so that after the coordinate conversion means 14 performs coordinate conversion on the biometric information image such that the biometric information image is reversed in the up/down or left/right direction based on the slide direction, the device determines the movement direction and movement distance. Or, when the device does not use the biometric information image, the device may convert the detected movement direction rather than the biometric information image.

That is, the fingerprint authentication device 102 is configured so that in order to properly detect the movement direction, the movement direction of a finger on the fingerprint sensor 31 is previously input as a reference direction by the reference direction setting means 41 and stored as a reference value (initial value) to previously correct the movement direction in the storage means 22 (initial value setting step), and the movement direction is corrected using the set reference value (correction step).

Figure 21:
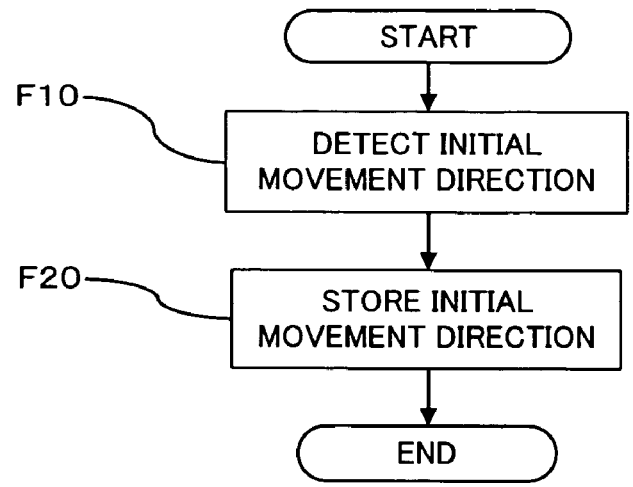
FIG. 21 is a flow chart to explain how a movement direction is corrected in the second modification of the fingerprint authentication device as one embodiment of the invention.
Figure 22:
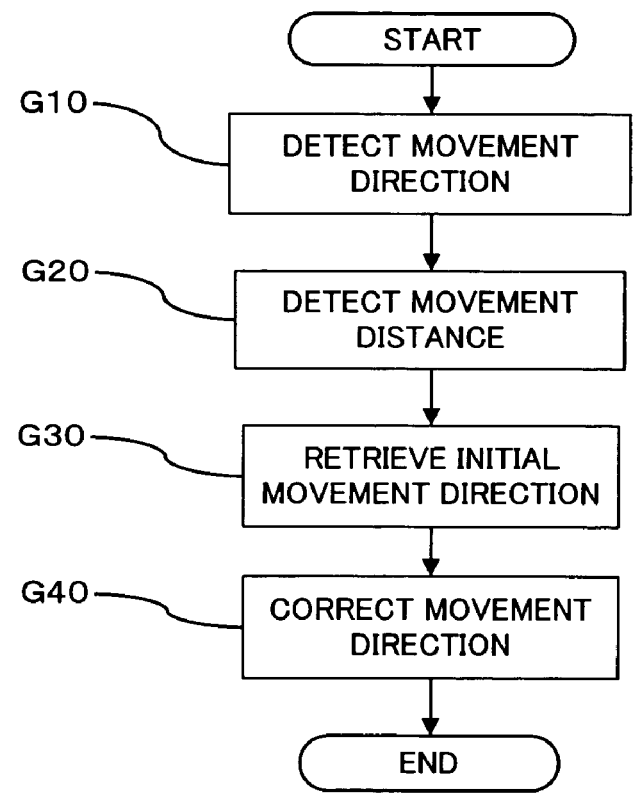
FIG. 22 is a flow chart to explain how a movement direction is corrected in the second modification of the fingerprint authentication device as one embodiment of the invention.

Then, how to correct the movement direction in the fingerprint authentication device 102 as the second modification will be explained with reference to flow charts shown in FIGS. 21 and 22. Note that FIG. 21 is a flow chart (steps F10 to F20) for explanation of details of the initial value setting step, FIG. 22 is a flow chart (steps G10 to G40) for explanation of details of the movement direction correction step.

In the initial value setting step, first, the movement direction input as a reference direction is detected by the movement direction detection means 11 (step F10), and then the detected movement direction is stored as an initial value (initial direction) in the storage means 22 (step F20), and the process is terminated.

Further, in the movement direction correction step, the movement direction is detected by the movement direction detection means 11 (step G10) and the movement distance is detected by the movement distance detection means 42 (step G20). Note that the movement direction detection step and movement distance detection step may be reversed in order or performed simultaneously.

Next, the biometric information movement direction correction means 40 retrieves the initial value (initial direction) stored in step F20 of the initial value setting step from the storage means 22 (step G30) in order to calculate a difference between the movement direction detected in step G10 and the initial direction for correction of the movement direction (step G40). The pointer movement control unit 43 controls a pointer so that it is moved on the display in the corrected movement direction.

As described above, according to the fingerprint authentication device 102 as the second modification of the invention, the reference direction corresponding to the movement direction of a living body site is previously set up as an initial value and the movement direction of the living body site is corrected using the initial value to allow the biometric information collection means 10 to be used in various directions, and even when the degree of freedom of the using direction of the biometric information collection means 10 is high, the device is able to properly detect the movement direction of the living body site and to increase the degree of freedom of the mounting direction the sensor providing the biometric information collection means 10.

Accordingly, even if the fingerprint sensor 31 is used in an upside down position or a lateral position when the fingerprint sensor 31 is used as a pointing device, the pointer can be moved on the display 81 in the direction input by the user.

Note that although in FIG. 19, the position detection means 16, the instruction means 17, the movement direction search range reduction means 12, the movement stop detection means 13, the feature extraction means 32, the matching degree calculation means 19, the matching degree determination means 20, the biometric information central position detection means 21, the storage means 22 etc., are not illustrated for simplification, the device of the invention is not limited to the configuration of FIG. 19, but may include all of or at least a portion of the above components and allow the corresponding components to function individually.

(D) Application Examples

Examples of applications of the fingerprint authentication device of the invention will be shown below.

(1) Mobile Phone

Figure 24A:
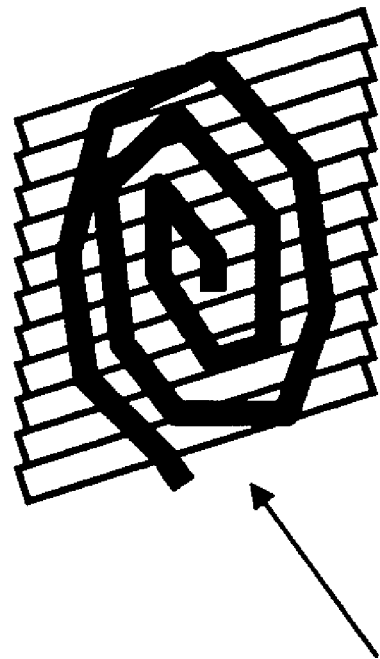
FIGS. 24(a), 24(b) are diagrams illustrating examples of fingerprint images derived from images collected in the states of FIGS. 23(b), 23(c)
Figure 24B:
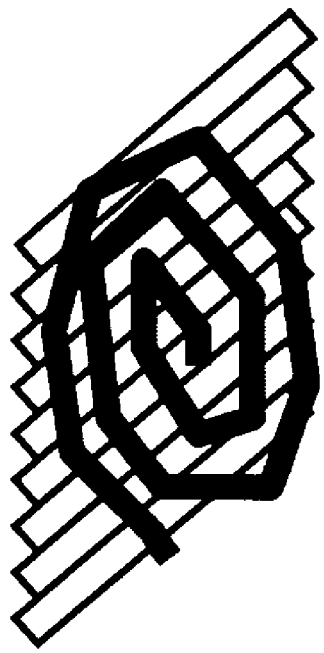

FIGS. 23(*a*), 23(*b*), 23(*c*) are diagrams illustrating examples in which the fingerprint authentication device of the invention is applied to a mobile device (mobile phone) 200 provided with a sweep fingerprint sensor and FIGS. 24(*a*), 24(*b*) are diagrams illustrating examples of fingerprint images derived from images collected in the states of FIGS. 23(*b*), 23(*c*).

The mobile device 200 shown in FIGS. 23(*a*) to 23(*c*) incorporates a sweep fingerprint sensor 31 therein for the purpose of inclusion of functions such as owner authentication. As a mobile device such as a recent mobile phone is reduced in volume, how a user holds the device changes in various forms. Particularly, since the user holds the mobile phone by one hand, how the user holds the phone is considered to easily change. At the time of enrollment, the user was unfamiliar to sliding of his/her finger on the sensor, but after tried matching several times, the user becomes familiar to the sliding and in some cases, changes his/her way of holding the phone.

FIGS. 23(*a*), 23(*b*) illustrate examples in which a rotational displacement around the normal to a paper is present. In general, although when a rotational displacement between enrollment data and input data is present, authentication ability is reduced, according to the invention, a fingerprint image is coordinate-converted so that the slide direction points downward and therefore authentication can be performed without a rotational displacement, as shown in FIGS. 24(*a*), 24(*b*).

Note that the rotational displacement may be corrected by coordinate converting the fingerprint image or by coordinate converting the enrollment data or matching data. However, if the fingerprint image is previously coordinate converted, the display direction of images corresponding to the enrollment data and input data becomes independent of the slide direction when the fingerprint image is displayed.

(2) PDA

FIGS. 25(*a*), 25(*b*) are diagrams illustrating examples in which the fingerprint authentication device of the invention is applied to a mobile device (PDA: Portable Digital Assistants) provided with a sweep fingerprint sensor and a PDA 201 shown in FIGS. 25(*a*), 25(*b*) incorporates thereon the sweep fingerprint sensor 31 that is disposed in the vertical direction (90 degrees or 270 degrees).

The slide direction expected in the PDA 201 is the horizontal direction and a user (subject) is able to input his/her fingerprint using either his/her right or left hand.

(3) PDA

FIGS. 26(*a*), 26(*b*) are diagrams illustrating examples in which the fingerprint authentication device of the invention is applied to a mobile device (PDA) provided with a sweep fingerprint sensor and the configuration of the PDA 202 shown in FIGS. 26(*a*), 26(*b*) is similar to that after 90-degree rotation of the PDA 201 shown in FIGS. 25(*a*), 25(*b*), and the PDA 202 is usable even after its 180-degree rotation.

The PDA 202 allows a user to input his/her fingerprint irrespective of whether the device is rotated 180 degrees.

(4) PDA

Figure 27A:
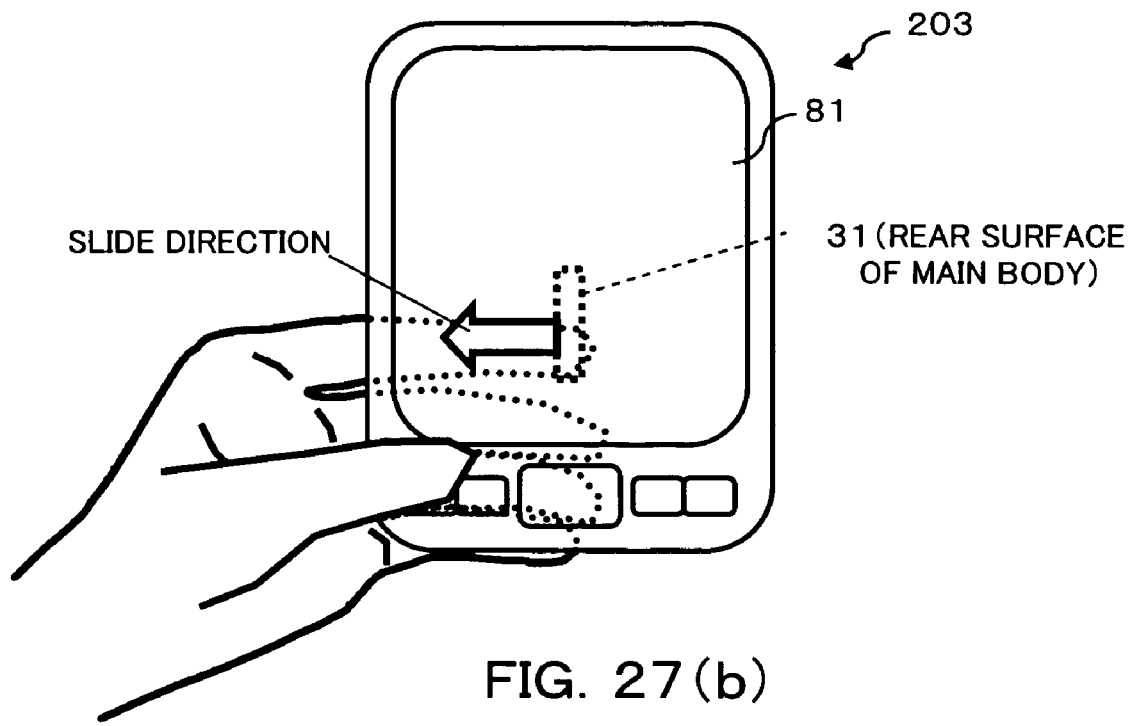
FIGS. 27(a), 27(b) are diagrams illustrating examples in which the fingerprint authentication device of the invention is applied to a mobile device (PDA) provided with the sweep fingerprint sensor.
Figure 27B:
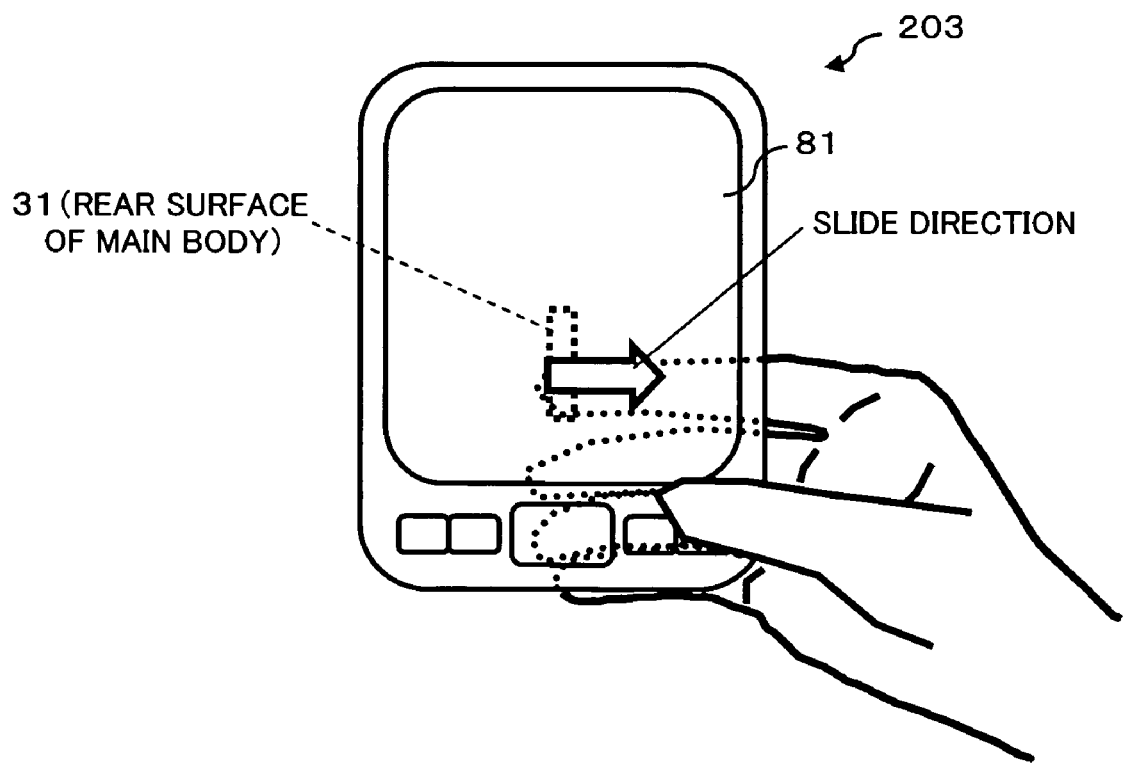

FIGS. 27(*a*), 27(*b*) are diagrams illustrating examples in which the fingerprint authentication device of the invention is applied to a mobile device (PDA) provided with a sweep fingerprint sensor. A PDA 203 shown in FIGS. 27(*a*), 27(*b*) incorporates thereon the sweep fingerprint sensor that is disposed on a surface opposing the surface on which the display 81 of a main body 203*a* is formed. The sensor is mounted in the vertical direction (90 degrees or 270 degrees).

The slide direction expected in the PDA 203 is the horizontal direction and a user (subject) is able to input his/her fingerprint using either his/her right or left hand.

(5) Laptop PC

FIGS. 28(*a*), 28(*b*) are diagrams illustrating examples in which the fingerprint authentication device of the invention is applied to a mobile device (laptop PC (Personal Computer)) provided with a sweep fingerprint sensor and FIG. 28(*a*) is a diagram illustrating a display unit 204*b* in an unfolded state, and FIG. 28(*b*) is a diagram illustrating a display unit 204*b* as a front unit in a folded state.

The laptop PC 204 shown in FIGS. 28(*a*), 28(*b*) incorporates thereon the sweep fingerprint sensor 31 adjacent to the display 81 of the display unit 204*b* in the horizontal direction, and further, similarly to the fingerprint authentication device 1 shown in FIG. 12, a main body 204*a* and the display unit 204*b* provided with the display 81 are openably connected together through a two-axis hinge (nail clipper hinge) 204*c*.

Further, as shown in FIG. 28(*b*), the display unit 204*b* of the laptop PC 204 is rotated about an axis "b" of the two-axis hinge 204*c* and further folded through an axis "a", and when the display unit is folded so as to allow the display 81 to serve as a front of the PC, a screen to be displayed on the display 81 is displayed in such a manner that the screen is rotated 180 degrees.

That is, although in the example shown in FIG. 28(*a*), the sequence of letters "ABC" is shown as an upright image, even when the display unit 204*b* is rotated about the axis "b" through the two-axis hinge 204*c* and further folded by its rotation about the axis "a", so as to allow the display 81 to serve as a front of the PC, the sequence of letters "ABC" is displayed as an upright image, as shown in FIG. 28(*b*).

Although in the laptop PC 204, the slide direction during use in a folded state is reversed compared to that during use in an unfolded state, the invention allows a user to input his/her fingerprint independent of 180-degree rotation of the device.

According to the invention, the display orientation of the display 81 is rotated 180 degrees and accordingly the slide direction and the movement direction of a cursor are also displaced 180 degrees, but correction of movement direction is performed, thereby causing the movement direction of the cursor not to rotate by 180 degrees.

(6) Tablet PC

FIGS. 29(*a*), 29(*b*), 30 (*a*), 30(*b*) are diagrams illustrating examples in which the fingerprint authentication device of the invention is applied to a mobile device (tablet PC) provided with a sweep fingerprint sensor, FIG. 29(*a*) is a diagram illustrating a state where a tablet PC 205 is used in the vertical direction, FIG. 29(*b*) is a diagram illustrating a state where the tablet PC 205 is used in the horizontal direction, FIG. 30(*a*) is a diagram illustrating a state where a tablet PC 206 is used in the vertical direction, and FIG. 30(*b*) is a diagram illustrating a state where the tablet PC 206 is used in the horizontal direction.

The tablet PC 205 shown in FIGS. 29(*a*), 29(*b*) incorporates thereon the sweep fingerprint sensor 31 aligned with the longitudinal direction of the display 81 of a device main body and the tablet PC 206 shown in FIGS. 30(*a*), 30(*b*) incorporates thereon the sweep fingerprint sensor 31 aligned with the minor side direction of the display 81 of the device main body.

Further, the tablet PCs 205, 206 can be disposed so that the PCs are rotated 90 degrees or 270 degrees in response to the display orientation of the display. The tablet PCs 205, 206 allow a user to input his/her fingerprint independent of 90-degree, 180-degree, 270-degree rotation of the device.

Further, when as shown in FIG. 29(*b*), the tablet PC 205 is used in a horizontal direction, i.e., used in such a manner that it is rotated 90 degrees in a clockwise direction from the tablet PC being used in a vertical direction as shown in FIG. 29(*a*), a screen to be displayed on the display 81 is rotated 90 degrees and displayed.

That is, although in the example shown in FIG. 29(*a*), the sequence of letters "ABC" is displayed as an upright image, even when the tablet PC 205 is rotated 90 degrees in a clockwise direction from its current state, the sequence of letters "ABC" can be displayed as an upright image, as shown in FIG. 29(*b*).

Likewise, when as shown in FIG. 30(*b*), the tablet PC 206 is used in the horizontal direction, i.e., used in such a manner that it is rotated 90 degrees in a clockwise direction from the orientation of the tablet PC being used in the vertical direction as shown in FIG. 30(*a*), a screen to be displayed on the display 81 is rotated 90 degrees and displayed.

That is, although in the example shown in FIG. 30(*a*), the sequence of letters "ABC" is shown as an upright image, even when the tablet PC 206 is rotated 90 degrees in a clockwise direction from its current state, the sequence of letters "ABC" can be displayed as an upright image, as shown in FIG. 30(*b*).

Further, when the device is disposed so that the slide direction points in the up/down direction, or left/right direction, enrolling previously any one or more out of ten fingers of a subject, or any one or more out of both thumbs, respectively, allows the device to maintain a strong authentication performance even if the device is disposed so as to change the disposing direction.

Note that although the tablet PC 205 shown in FIG. 29(*a*) is provided with the fingerprint sensor 31 on the right side of the display 81, the tablet PC of the invention is not limited to this configuration, but for example, may be provided with the fingerprint sensor 31 on the left side of the display 81, meaning that various modifications may be made without departing from the scope of the invention. Further, when the tablet PC is provided with the fingerprint sensor 31 on the left side of the display 81, 90-degree rotation of a main body in a clockwise direction will cause the fingerprint sensor 31 to be positioned on the upper side of the display 81.

Likewise, although the tablet PC 206 shown in FIG. 30(*a*) is provided with the fingerprint sensor 31 on the upper side of the display 81 on the paper, the tablet PC of the invention is not limited to this configuration, but for example, may be provided with the fingerprint sensor 31 on the lower side of the display 81 on the paper, meaning that various modifications may be made without departing from the scope of the invention. Further, when the tablet PC is provided with the fingerprint sensor 31 on the lower side of the display 81 on the paper, 90-degree rotation of a main body in a clockwise direction will cause the fingerprint sensor 31 to be positioned on the left side of the display 81 on the paper.

Additionally, when these tablet PCs 205, 206 are to be rotated, the main body may be rotated in a counterclockwise direction.

(E) Others

It should be noted that the invention is not limited to the foregoing embodiments, but various modifications may be made without departing from the scope of the invention.

For example, in the foregoing embodiments, although the cases in which an object to be used for authentication is the finger of a person and a fingerprint image is collected as biometric information have been explained, the invention is not limited to these cases, but may be applied, in a manner similar to the above described cases, to the cases in which a palm print image or blood vessel image is collected as biometric information from a palm to be identified, producing action and effect similar to the above described cases.

It is expected that one of ordinary skill, when guided by the concepts and principles disclosed in the embodiments of the invention, will be readily capable of implementing and manufacturing the invention.

The fingerprint authentication device of the invention is suitable for use in personal authentication systems typified by compact information devices having insufficient space available to incorporate a sensor, such as a mobile phone and PDA, and is considered to have extremely high usefulness.

What is claimed is:

1. A biometric information input device comprising:
   a biometric information collection unit reading a relatively-moving living body site to thereby successively collect a plurality of partial images of said living body site as biometric information;
   a movement direction detection unit detecting a movement direction of said living body site with respect to said biometric information collection unit based on said biometric information; and
   a coordinate conversion unit performing a coordinate conversion on said biometric information, to thereby provide coordinate converted biometric information; and
   a display displaying an image of biometric information of the living body site from the coordinate converted biometric information,
   wherein the coordinate conversion unit performs the coordinate conversion using said movement direction detected by said movement direction unit so that said movement direction becomes a vertical and downward direction with respect to the displayed image being upright, and so that the display thereby displays the image as upright.

2. The biometric information input device according to claim 1, further comprising a movement direction search range reduction unit, when the same movement direction has been successively detected by said movement direction detection unit, reducing a movement direction search range defined as a range over which said movement direction detection unit detects said movement direction to a predetermined range including said detected movement direction.

3. The biometric information input device according to claim 1, further comprising a movement stop detection unit detecting a stop of movement of said living body site, wherein when the stop of movement of said living body site has been detected by said movement stop detection unit, collection by the biometric information collection unit is stopped.

4. A biometric information processing method Comprising:
   reading a relatively-moving living body site by a biometric information collection unit to thereby successively collect a plurality of partial images of said living body site as biometric information;
   detecting a movement direction of said living body site with respect to said biometric information collection unit based on said biometric information;
   performing a coordinate conversion on said biometric information to thereby provide coordinate converted biometric information; and
   displaying an image of biometric information of the living body site from the coordinate converted biometric information,
   wherein said performing performs the coordinate conversion using said movement direction detected in said detecting so that said movement direction becomes a vertical and downward direction with respect to the displayed image being upright, and so that said displaying thereby displays the image as upright.

5. The biometric information processing method according to claim 4, further comprising:
   when the same movement direction has been successively detected in said detecting, reducing a movement direction search range defined as a range over which said movement direction is detected in said detecting to a predetermined range including said detected movement direction.

6. The biometric information processing method according to claim 4, further comprising:
   detecting a stop of movement of said living body site, and
   when the stop of movement of said living body site has been detected in said detecting a stop of movement, stopping the collection of the plurality of partial images.

7. A non-transient computer readable recording medium recording a biometric information processing program for causing a computer to perform:
   reading a relatively-moving living body site by a biometric information collection unit to thereby successively collect a plurality of partial images of said living body site as biometric information;
   detecting a movement direction of said living body site with respect to said biometric information collection unit based on said biometric information;
   performing a coordinate conversion on said biometric information, to thereby provide coordinate converted biometric information; and
   displaying an image of biometric information of the living body site from the coordinate converted biometric information,
   wherein said performing performs the coordinate conversion using said movement direction detected in said detecting so that said movement direction becomes a vertical and downward direction with respect to the displayed image being upright, and so that said displaying thereby displays the image as upright.

8. The non-transient computer readable recording medium recording a biometric information processing program according to claim 7, wherein said computer is caused to perform:
   when the same movement direction has been successively detected in the case where said biometric information processing program causes said computer to perform said detecting, reducing a movement direction search range defined as a range over which said movement direction is detected in said detecting to a predetermined range including said detected movement direction.

9. The non-transient computer readable recording medium recording a biometric information processing program according to claim 7, wherein said computer is caused to perform:
   detecting a stop of movement of said living body site; and
   when the stop of movement of said living body site has been detected in said detecting a stop, stopping input of said biometric information.

* * * * *

UNITED STATES PATENT AND TRADEMARK OFFICE
CERTIFICATE OF CORRECTION

Page 1 of 1

PATENT NO. : 7,809,168 B2
APPLICATION NO. : 11/082137
DATED : October 5, 2010
INVENTOR(S) : Yukihiro Abiko et al.

It is certified that error appears in the above-identified patent and that said Letters Patent is hereby corrected as shown below:

Column 33, Line 49-50 in Claim 4, delete "Comprising:" and insert -- comprising: --, therefor.

Signed and Sealed this
Fourth Day of January, 2011

David J. Kappos
*Director of the United States Patent and Trademark Office*